(12) United States Patent
Aybay

(10) Patent No.: US 8,351,747 B1
(45) Date of Patent: Jan. 8, 2013

(54) SYSTEMS AND METHODS FOR IDENTIFYING CABLE CONNECTIONS IN A COMPUTING SYSTEM

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/475,205

(22) Filed: May 18, 2012

Related U.S. Application Data

(63) Continuation of application No. 12/564,080, filed on Sep. 22, 2009, now Pat. No. 8,184,933.

(51) Int. Cl.
G02B 6/44 (2006.01)

(52) U.S. Cl. ............ 385/100; 385/101; 385/134

(58) Field of Classification Search .......... None
See application file for complete search history.

(56) References Cited

U.S. PATENT DOCUMENTS

| | | | |
|---|---|---|---|
| 4,722,603 A | 2/1988 | Graebner et al. |
| 4,994,675 A | 2/1991 | Levin et al. |
| 5,138,615 A | 8/1992 | Lamport et al. |
| 5,801,641 A | 9/1998 | Yang et al. |
| 5,926,473 A | 7/1999 | Gridley |
| 5,987,028 A | 11/1999 | Yang et al. |
| 5,991,295 A | 11/1999 | Tout et al. |
| 6,049,542 A | 4/2000 | Prasad |
| 6,075,773 A | 6/2000 | Clark et al. |
| 6,539,027 B1 | 3/2003 | Cambron |
| 6,614,236 B1 | 9/2003 | Karam |
| 6,618,515 B2 | 9/2003 | Kimura et al. |
| 6,636,511 B1 | 10/2003 | Roy et al. |
| 6,704,307 B1 | 3/2004 | Graves et al. |
| 6,816,486 B1 | 11/2004 | Rogers |
| 6,868,082 B1 | 3/2005 | Allen, Jr. et al. |
| 7,038,135 B1 | 5/2006 | Chan et al. |
| 7,049,937 B1 | 5/2006 | Zweig et al. |

(Continued)

FOREIGN PATENT DOCUMENTS

EP 1 892 905 A1 2/2008

OTHER PUBLICATIONS

Electronic design, "Optimized Interconnect Eliminates Limits in Orthogonal Architectures" [online] [retrieved on Nov. 5, 2008] Retrieved from the Internet: <URL: http://electronicdesign.com/Articles/Print.cfm?AD=1&ArticleID=13277>, (10 pgs).

(Continued)

Primary Examiner — Mike Stahl
(74) Attorney, Agent, or Firm — Cooley LLP

(57) ABSTRACT

A system includes a cable having a first end portion, a second end portion and a cable display module mechanically coupled to the first end portion of the cable. The cable has at least one optical fiber extending through the cable between the first end portion and the second end portion. The at least one optical fiber is configured to optically couple a first chassis with a second chassis when the first end portion of the cable is mechanically coupled to the first chassis and the second end portion of the cable is mechanically coupled to the second chassis. The cable display module is configured to be electrically coupled to the first chassis when the first end portion of the cable is mechanically coupled to the first chassis such that the cable display module receives from the first chassis an electrical signal representing an identifier associated with the second chassis.

20 Claims, 10 Drawing Sheets

U.S. PATENT DOCUMENTS

| | | |
|---|---|---|
| 7,173,931 B2 | 2/2007 | Chao et al. |
| 7,227,345 B1 | 6/2007 | Dehaan et al. |
| 7,229,020 B2 | 6/2007 | Goodison et al. |
| 7,230,947 B1 | 6/2007 | Huber et al. |
| 7,248,760 B1 | 7/2007 | Corbalis et al. |
| 7,269,673 B2 | 9/2007 | Kim et al. |
| 7,277,429 B2 | 10/2007 | Norman et al. |
| 7,280,356 B2 | 10/2007 | Pfahnl et al. |
| 7,406,038 B1 | 7/2008 | Oelke et al. |
| 7,408,927 B2 | 8/2008 | George |
| 7,415,034 B2 | 8/2008 | Muller et al. |
| 7,496,252 B1 | 2/2009 | Corbalis et al. |
| 7,505,458 B2 | 3/2009 | Menon et al. |
| 7,526,582 B2 | 4/2009 | Best et al. |
| 7,552,262 B1 | 6/2009 | Turner et al. |
| 7,693,142 B2 | 4/2010 | Beshai |
| 7,757,936 B2 | 7/2010 | Aguren et al. |
| 7,940,182 B2 | 5/2011 | Lange et al. |
| 7,965,186 B2 | 6/2011 | Downie et al. |
| 2002/0064170 A1 | 5/2002 | Siu et al. |
| 2002/0181455 A1 | 12/2002 | Norman et al. |
| 2003/0021580 A1 | 1/2003 | Matthews |
| 2004/0023558 A1 | 2/2004 | Fowler et al. |
| 2005/0058128 A1 | 3/2005 | Carson et al. |
| 2005/0165710 A1 | 7/2005 | Givaty |
| 2005/0249477 A1 | 11/2005 | Parrish |
| 2005/0275504 A1 | 12/2005 | Torza |
| 2006/0013207 A1 | 1/2006 | McMillen et al. |
| 2006/0126610 A1 | 6/2006 | Ryan et al. |
| 2006/0165085 A1 | 7/2006 | Konda |
| 2007/0016715 A1 | 1/2007 | Phelps et al. |
| 2007/0140229 A1 | 6/2007 | Tang |
| 2007/0153462 A1 | 7/2007 | Crippen et al. |
| 2008/0044181 A1 | 2/2008 | Sindhu |
| 2008/0112133 A1 | 5/2008 | Torudbakken et al. |
| 2008/0130517 A1 | 6/2008 | Lee et al. |
| 2008/0151863 A1 | 6/2008 | Lawrence et al. |
| 2008/0159738 A1 | 7/2008 | Lavranchuk |
| 2008/0186875 A1 | 8/2008 | Kitani |
| 2008/0192648 A1 | 8/2008 | Galles |
| 2008/0212472 A1 | 9/2008 | Musacchio et al. |
| 2008/0214059 A1 | 9/2008 | Rothermel et al. |
| 2008/0318465 A1 | 12/2008 | Johnsen et al. |
| 2008/0320117 A1 | 12/2008 | Johnsen et al. |
| 2009/0003327 A1 | 1/2009 | Zang et al. |
| 2009/0028229 A1 | 1/2009 | Cagno et al. |
| 2009/0175281 A1 | 7/2009 | Higuchi et al. |
| 2010/0165983 A1 | 7/2010 | Aybay et al. |
| 2010/0165984 A1 | 7/2010 | Aybay et al. |

OTHER PUBLICATIONS

Jonathan S. Turner et al. "Multirate Clos Networks" IEEE Communications Magazine, Oct. 2003, pp. 1-11.

H. Jonathan Chao et al. "Matching Algorithms for Three-Stage Bufferless Clos Network Switches" IEEE Communications Magazine, Oct. 2003, pp. 46-54.

Gunes Aybay et al., "Front-to-Back Cooling System for Modular Systems with Orthogonal Midplane Configuration" U.S. Appl. No. 12/167,604, filed Jul. 3, 2008, (25 pgs).

Search Report for European Application No. 09170037.7, mailed Dec. 10, 2009, 7 pages.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Office Action mailed May 25, 2010 for U.S. Appl. No. 12/345,500 (13 pages).

Office Action mailed Jun. 10, 2010 for U.S. Appl. No. 12/345,502 (24 pages).

Office Action mailed Jun. 8, 2010 for U.S. Appl. No. 12/414,825 (17 pages).

U.S. Appl. No. 12/414,825, filed Mar. 31, 2009 entitled "Distributed Multi-Stage Switch Fabric" (72 pgs).

U.S. Appl. No. 12/613,313, filed Nov. 5, 2009 entitled "Methods and Apparatus for Upgrading a Switch Fabric" (63 pgs).

U.S. Appl. No. 12/752,704, filed Apr. 1, 2010 entitled "Apparatus and Methods Related to the Packaging and Cabling Infrastructure of a Distributed Switch Fabric" (39 pgs).

SYSTEMS AND METHODS FOR IDENTIFYING CABLE CONNECTIONS IN A COMPUTING SYSTEM

CROSS REFERENCE TO RELATED APPLICATION

This application is a continuation of U.S. application Ser. No. 12/564,080, filed Sep. 22, 2009, entitled "Systems and Methods for Identifying Cable Connections in a Computing System," now U.S. Pat. No. 8,184,933, which is incorporated herein by reference in its entirety.

BACKGROUND

Embodiments described herein relate generally to methods and apparatus for identifying cable connections in a computing system.

Large-scale computing systems, such as switch fabrics, can use a large number of cables. Correctly connecting the cables in such a system can be difficult and confusing because of the large number of connections. If the cables are not correctly connected, the system can experience errors and/or not operate as intended.

In known computing systems, each cable can be labeled with a serial number via an external adhesive tag. Such an external adhesive tag provides a visual identification to an operator, for example, installing or servicing the system of the identity of the cable. Additionally, tables and charts can be used to monitor the desired arrangement of which cable is connected to which port of which chassis. Such computing systems, however, do not provide an indication if the cables within the computing system are incorrectly connected. Additionally, keeping track of the cables in such computing systems can be difficult. Further, external adhesive tags attached to the cables can fall off and/or become unreadable over time. Moreover, in large computing systems, a large number of cables can be used and can span large distances (e.g., between rooms and/or buildings). In such systems, the cable connections can be complicated and determining whether the cables are correctly coupled can be difficult.

Thus, a need exists for a system and method to easily and correctly identify and verify the cable connections in a large-scale computing system. Additionally, a need exists to provide an indication to an operator when the cables within the computing system are incorrectly connected.

SUMMARY

A system includes a cable having a first end portion, a second end portion and a cable display module mechanically coupled to the first end portion of the cable. The cable has at least one optical fiber extending through the cable between the first end portion and the second end portion. The at least one optical fiber is configured to optically couple a first chassis with a second chassis when the first end portion of the cable is mechanically coupled to the first chassis and the second end portion of the cable is mechanically coupled to the second chassis. The cable display module is configured to be electrically coupled to the first chassis when the first end portion of the cable is mechanically coupled to the first chassis such that the cable display module receives from the first chassis an electrical signal representing an identifier associated with the second chassis.

DETAILED DESCRIPTION

Figure 1:
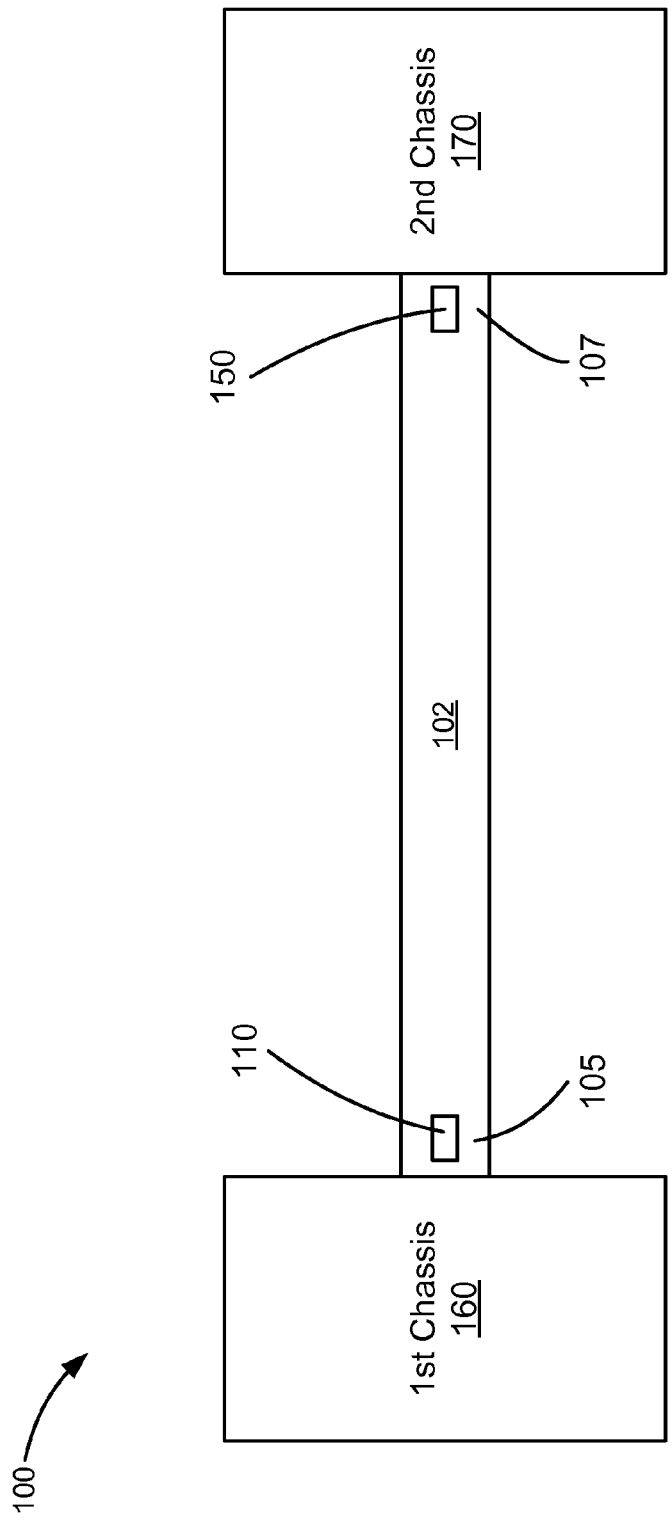
FIG. 1 is a schematic illustration of a system having a cable assembly disposed between two chassis, according to an embodiment.

A computing system includes a cable having a first end portion, a second end portion and a cable display module mechanically coupled to the first end portion of the cable. The cable has at least one optical fiber extending through the cable between the first end portion and the second end portion. The at least one optical fiber is configured to optically couple a first chassis with a second chassis when the first end portion of the cable is mechanically coupled to the first chassis and the second end portion of the cable is mechanically coupled to the second chassis. The cable display module is configured to be electrically coupled to the first chassis when the first end portion of the cable is mechanically coupled to the first chassis such that the cable display module receives from the first chassis an electrical signal representing an identifier associated with the second chassis.

An optical signal associated with the identifier can be sent from the second chassis to the first chassis, and the first chassis can convert the optical signal into the electrical signal sent to the cable display module. The cable display module can be configured to display the identifier (e.g., serial number) associated with the second chassis on a display device. This can aid an operator in determining whether the cable is correctly coupled between the first chassis and the second chassis. In some embodiments, the cable display module can further receive and display an identifier associated with the first chassis, a port number (physical and/or logical) of the first chassis to which the cable is connected, a port number (physical and/or logical) of the second chassis to which the cable is connected, and/or the like.

In some embodiments, the cable display module includes a memory in which an identifier associated with the cable, a length of the cable, a type of the cable, a number of optical fibers within the cable and/or the like is stored. Accordingly, the cable display module can also display such information on the display device. In computing systems having a large number of cables, such information can further aid an operator in determining whether the cable is correctly coupled.

As used herein, a switch fabric is, for example, a network that includes multiple stages of switch modules that operatively connect one or more input modules with one or more output modules. A switch fabric is configured to receive a signal from an input module, forward the signal through the multiple stages of the switch fabric, and output the signal to an output module. Switch modules of the multiple stages of switches route the signal such that the signal arrives at its destination. Such a switch fabric can be, for example, a Clos network.

As used herein, a module that is within a switch fabric can be, for example, any assembly and/or set of operatively-coupled electrical components that define one or more switches within a stage of a switch fabric. An input/output module, for example, can be any assembly and/or set of operatively-coupled electrical components configured to send data to and/or receive data from a switch fabric. In some embodiments, for example, an input/output module can be an access switch configured receive data from a server, prepare data to enter into the switch fabric, and send the data to the switch fabric. In some embodiments, a module can include, for example, a memory, a processor, electrical traces, optical connectors, and/or the like.

As used herein, "associated with" can mean, for example, included in, physically located with, a part of, and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric. Additionally, "associated with" can mean, for example, references, identifies, characterizes, describes, and/or sent from. For example, a serial number associated with a chassis can be a serial number that identifies and/or references the chassis. For another example, information associated with a cable can include a serial number, a cable length, a cable type, and/or the like. For yet another example, a signal associated with a chassis can include a signal sent from the chassis.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIGS. 8 and 9 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a computing system 100 including a cable assembly 102 disposed between a first chassis 160 and a second chassis 170, according to an embodiment. The first chassis 160 can include, for example, line cards having optical or electrical modules. In some embodiments, for example, the first chassis 160 includes modules within a switch fabric, as described in further detail herein. In other embodiments, the first chassis can include any other type of optical or electrical modules such as, for example, servers, access switches to a switch fabric and/or the like. The second chassis 170 can be structurally and functionally similar to the first chassis 160 and can include similar types of optical or electrical modules.

The cable assembly 102 includes a first end portion 105 and a second end portion 107. The cable assembly 102 includes at least one optical fiber extending through the cable assembly 102 between the first end portion 105 and the second end portion 107. The first end portion 105 of the cable assembly 102 is mechanically coupled to the first chassis 160 by any suitable mechanism. In some embodiments, for example, a spring-loaded cable end housing can be used to couple the first end portion 105 of the cable assembly 102 to the first chassis 160, as further described in detail herein. In other embodiments, an interface fit, a threaded connector, a snap connector and/or the like can be used to interface the first end portion 105 of the cable assembly 102 with the first chassis 160. The second end portion 107 of the cable assembly 102 can be mechanically coupled to the second chassis 170 in a similar manner.

Through the at least one optical fiber, the first chassis 160 is optically coupled to the second chassis 170 such that optical signals can be sent between the first chassis 160 and the second chassis 170. In some embodiments, the optical signals sent between the first chassis 160 and the second chassis 170 can represent data packets, control information and/or any other information. For example, the second chassis 170 can send identifying information to the first chassis 160, such as, a serial number of the second chassis 170, a physical port identifier and/or a logical port identifier of a port of the second chassis 170 to which the first end portion 105 of the cable assembly 102 is coupled. In some embodiments, the second chassis 170 can also send error messages to the first chassis 160 indicating that the cable assembly is incorrectly connected to the first chassis 160. Similarly, the first chassis 160 can send similar identifying information and/or error messages to the second chassis 170 via the optical fiber.

Figure 2:
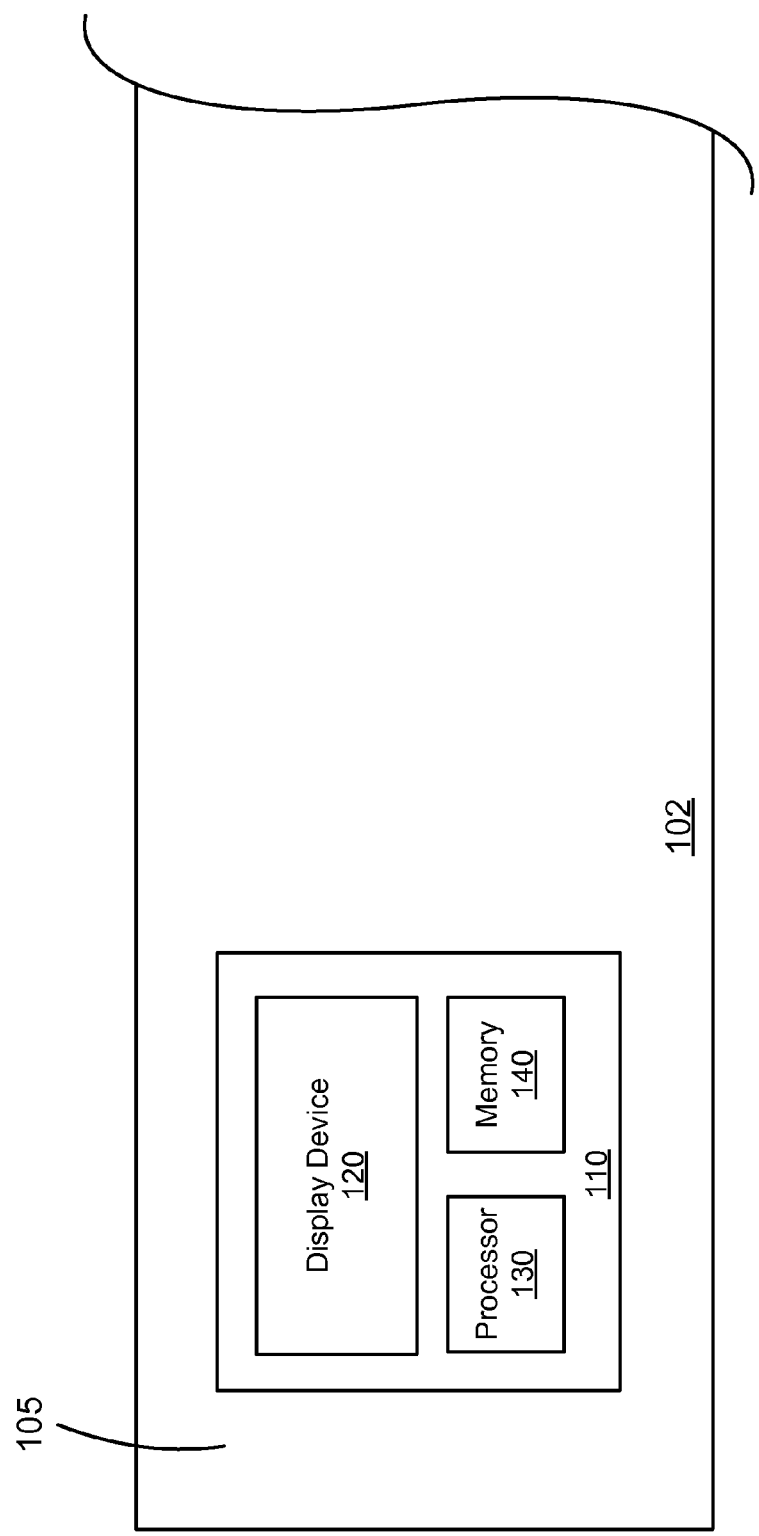
FIG. 2 is a detailed schematic illustration of a portion of the cable assembly shown in FIG. 1.

A cable display module 110 is coupled to the first end portion 105 of the cable assembly 102 and a cable display module 150 is coupled to the second end portion 107 of the cable assembly 102. The cable display module 150 is substantially similar to the cable display module 110, and is therefore not described in detail herein. FIG. 2 is a detailed schematic illustration of the first end portion 105 of the cable assembly 102 including the cable display module 110. The cable display module 110 is coupled to the first end portion 105 of the cable assembly by any suitable means. In some embodiments, for example, the cable display module 110 is part of a cable end housing of the first end portion 105 of the cable assembly 102, as described in further detail herein. In other embodiments, the cable display module can be embedded within or attached to an outer casing of the cable.

As shown in FIG. 2, the cable display module 110 includes a display device 120, a processor 130 and a memory 140. In some embodiments, the display device 120, the processor 130 and/or the memory 140 can be, for example, collectively disposed on a printed circuit board (PCB), a multi-chip module and/or an application specific integrated circuit (ASIC). The display device 120 can be any suitable display device configured to display information associated with the cable assembly 102, the first chassis 160 and/or the second chassis 170. In some embodiments, for example, the display device 120 can be a liquid crystal display (LCD).

The processor 130 can be any suitable processor configured to receive information from the first chassis 160, the second chassis 170 and/or the memory 140, and cause the information to be displayed on the display device 120 and/or stored in the memory 140. The processor 130 can be, for example, a microprocessor, a microcontroller, a programmable logic device (PLD), a complex programmable logic device (CPLD), a field-programmable gate array (FPGA), and/or the like.

The memory 110 can be any suitable processor-readable medium. In some embodiments, for example, the memory can be a read-only memory (ROM), a random-access memory (RAM), an erasable programmable read-only memory (EPROM), an electrically erasable programmable read-only memory (EEPROM), a flash memory and/or any other suitable processor-readable medium. In some embodiments, the memory 110 can store information about the cable assembly 102, the first chassis 160 and/or the second chassis 170. For example, the memory 110 can store information associated with a type of the cable assembly 102, a length of the cable assembly 102, an identifier of the cable assembly 102 (e.g., a serial number), the number of optical fibers within the cable assembly 102, an identifier of the first chassis 160, an identifier of a port (physical or logical) of the first chassis 160, an identifier of the second chassis 170, an identifier of a port (physical or logical) of the second chassis 170, and/or the like.

In some embodiments, the cable display module 110 is electrically coupled to the first chassis 160 by at least one electrical conductor (not shown in FIGS. 1 and 2). The electrical conductor can be disposed within the first end portion 105 of the cable and can extend from the first chassis 160 to the cable display module 110. Through the electrical conductor, the cable display module 110 can be powered, can receive data signals associated with the components of the computing system 100 and/or can receive control signals associated with the operation of one or more of the components of the computing system 100. In such embodiments, for example, the cable display module 110 can receive a signal associated with the first chassis 160 via the electrical conductor and cause a serial number associated with the first chassis 160 to be displayed. In some embodiments, the cable display module 110 can also receive error signals from the first chassis 160 via the electrical conductor and cause error information associated with the error signals to be displayed.

In use, an operator couples the first end portion 105 of the cable assembly 102 to the first chassis 160 and couples the second end portion 107 of the cable assembly 102 to the second chassis 170. As discussed above, this optically couples the first chassis 160 with the second chassis 170. Additionally, this electrically couples the cable display module 110 with the first chassis 160 and electrically couples the cable display module 150 with the second chassis 170. The second chassis 170 can then send identifying information associated with the second chassis 170 to the first chassis 160 via the optical fiber. As discussed above, such information can include, for example, a serial number of the second chassis 170, a physical port identifier and/or a logical port identifier of a port of the second chassis 170 to which the second end portion 107 of the cable assembly 102 is coupled, and/or the like. Further, as discussed above, the second chassis 170 can send error messages to the first chassis 160 via the optical fiber. Similarly, the first chassis 160 can send information associated with the first chassis 160 and/or error messages to the second chassis 170 via the optical fiber.

The first chassis 160 can power the cable display module 110 via an electrical conductor disposed within the first end portion 105 of the cable assembly 102. Additionally, the first chassis 160 can send an electrical signal associated with the first chassis 160 to the cable display module 110. Further, after the first chassis 160 receives information from the second chassis 170, the first chassis 160 can send an electrical signal to the cable display module 110 where the electrical signal is associated with the information received from the second chassis 170. Similarly, the second chassis 170 can power the cable display module 150 and can send the information associated with the second chassis 170 and the first chassis 160 to the cable display module 150 via at least one electrical conductor for display and/or storage.

In response to receiving the electrical signals associated with the first chassis 160 and the second chassis 170, the processor 130 of the cable display module 110 can store the information in the memory 140 and/or display the information on the display device 120 where the information is based on the electrical signals. Accordingly, the display device 120 can display an identifier associated with the second chassis 170, an identifier associated with the first chassis 160 and an identifier associated with the cable assembly 102. Additionally, in some embodiments, any other information associated with the computing system 100 can be displayed on the display device 120, such as, for example, a length of the cable assembly 102, the number of optical fibers within the cable assembly 102, a physical port identifier and/or a logical port identifier of a port of the first chassis 160 to which the first end portion 105 of the cable assembly 102 is coupled, a physical port identifier and/or a logical port identifier of a port of the second chassis 170 to which the second end portion 107 of the cable assembly 102 is coupled, and/or the like. Using the displayed information, an operator can determine whether the cable assembly 102 is correctly coupled. For example, the operator can view the display device to determine to which chassis (e.g., the second chassis 170) and to which port of the chassis the second end portion 107 of the cable assembly 102 is coupled.

In some embodiments, the first chassis 160, the second chassis 170, and/or a central control system (not shown) has stored or has access to information associated with the architecture of the system (e.g., which chassis should be coupled to other chassis). In such embodiments, the first chassis 160, the second chassis 170, and/or a central control system (not shown) can determine whether or not the cable assembly 102 is correctly coupled and accordingly send an electrical signal to the cable display module 110 indicating that the cable assembly 102 is correctly (or incorrectly) coupled. In response to receiving the electrical signal, the processor 130 of the cable display module 110 can display an indication on the display device 120 of the cable display module 110 indicating that the cable assembly 102 is correctly (or incorrectly) coupled.

In some embodiments, the cable display module 110 can include a battery (not shown in FIGS. 1 and 2). In such embodiments, the battery can be used as a backup power source. The battery can power the cable display module 110 when the first end portion 105 of the cable assembly 102 is not electrically coupled to the first chassis 160. In such embodiments, for example, the processor 130 of the cable display module 110 can cause the display device 120 to display information (e.g., a serial number of the cable assembly 102, a type of the cable assembly 102, a serial number of the first chassis 160, a serial number of the second chassis 170, etc.) stored within the memory 140 when an operator provides an indication to the cable display module 110 to display the information. Such an indication can be provided by, for example, an operator pressing a button (not shown in FIGS. 1 and 2) on the cable display module 110. Information associated with the first chassis 160 and the second chassis 170 can be received and stored in the memory 140 when the first portion 105 of the cable assembly 102 is electrically coupled to the first chassis 160. Such information can then be viewed by an operator after the first portion 105 of the cable assembly 102 is uncoupled from the first chassis 160 when the operator provides the indication to the cable display module 110 to display the information. In some embodiments, the battery can be a rechargeable battery that recharges when the first end portion 105 of the cable assembly 102 is electrically coupled to the first chassis 160.

In other embodiments, the cable display module is not configured to be electrically coupled to the first chassis. In such embodiments, the battery can be used as the primary source of power for the cable display module (e.g., the first chassis does not power the cable display module). In such embodiments, the cable display module does not receive information from the first chassis regarding components of the computing system. Accordingly, the cable display module is configured to display information associated with the computing system stored in the memory (e.g., information pertaining to the cable such as the cable serial number, the length of the cable, etc.) when an operator provides an indication to the display module to display the information (e.g., the operator pushes a button). In such embodiments, the display device can display the information for a predetermined amount of time (e.g., 30 seconds) and then turn the display off (e.g., to conserve battery life).

In still other embodiments, the cable display module can receive power and/or data from any other suitable source, such as, for example, a radio frequency (RF) connection between the cable display module and the first chassis, an RF connection between the cable display module and a portable device carried with an operator, a battery that an operator plugs into the cable display module and/or the like.

Figure 3:
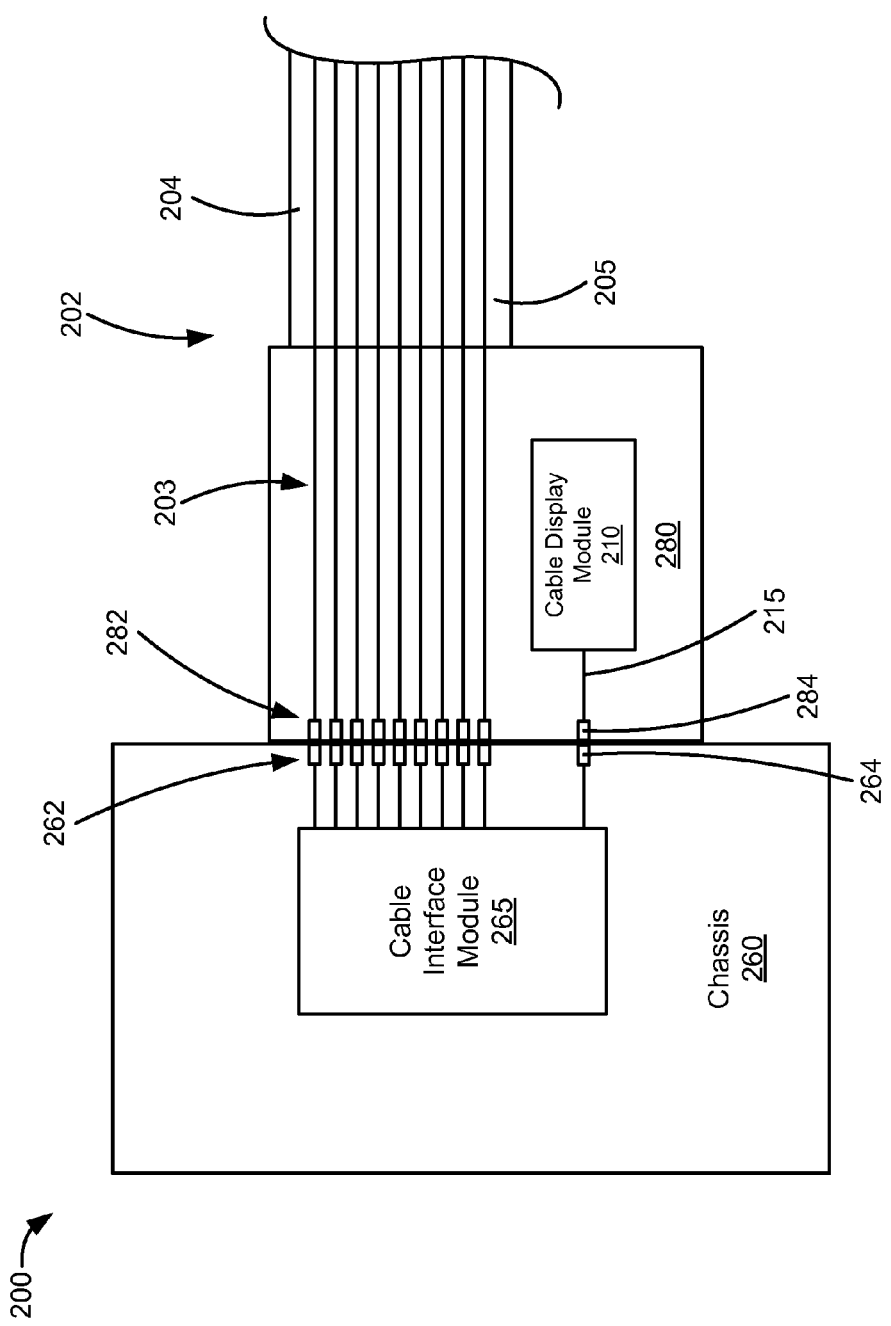
FIG. 3 is an illustration of a portion of a system having a cable assembly and a chassis, according to another embodiment.

FIG. 3 is an illustration of a portion of a computing system 200 having a cable assembly 202 and a chassis 260, according to another embodiment. The cable assembly 202 includes a cable 204 and a cable end housing 280. The cable 204 has multiple optical fibers 203 that are configured to optically couple the chassis 260 with another chassis (not shown in FIG. 3) such that optical signals can be sent between the chassis 260 and the other chassis, as described in further detail herein.

A first end portion 205 of the cable 204 is coupled to the cable end housing 280. The cable end housing 280 can be constructed of any suitable material. A second end portion (not shown in FIG. 3) of the cable 204 is coupled to a second cable end housing (not shown in FIG. 3). The second end portion of the cable 204 and the second cable end housing can be structurally and functionally similar to the first end portion 205 of the cable 204 and the cable end housing 280, respectively.

The cable end housing 280 includes a cable display module 210, at least one electrical conductor 215, multiple optical connectors 282 and at least one electrical connector 284. The optical fibers 203 of the cable 204 extend through the cable end housing 280 and are optically coupled to the optical connectors 282. The optical connectors 282 can be any suitable connectors configured to optically couple the optical fibers 203 with the chassis 260. For example, the optical connectors 282 can be multiple-pin connectors configured to receive multiple-pin connectors disposed on the chassis (e.g., optical connectors 262), hollow tubes that allow the cable end housing 280 to directly connect with the optical connectors 262, and/or the like.

The cable display module 210 can be similar to the cable display module 110, shown and described above. Accordingly, the cable display module 210 can include a processor (not shown in FIG. 3), a display device (not shown in FIG. 3) and a memory (not shown in FIG. 3), similar to the processor 130, the display device 120 and the memory 140 shown and described above.

In some embodiments, the memory (not shown in FIG. 3) can store information about the cable assembly 202, the chassis 260 and/or a second chassis (not shown in FIG. 3). For example, the memory can store information associated with a type of the cable assembly 202, a length of the cable assembly 202, an identifier of the cable assembly 202 (e.g., a serial number), the number of optical fibers within the cable assembly 202, an identifier of the chassis 260, an identifier of a port (physical or logical) of the chassis 260, an identifier of the second chassis, an identifier of a port (physical or logical) of the second chassis, and/or the like.

The at least one electrical conductor 215 and the electrical connector 284 electrically couple the cable display module 210 to the chassis 260. The electrical conductor 215 can be any electrical conductor configured to convey electrical signals between the cable display module 210 and the chassis 260. In some embodiments, for example, the electrical conductor 215 can be copper wire, an electrical trace on a printed circuit board (PCB), an electrical trace on an application specific integrated circuit (ASIC), and/or the like. The electrical conductor 215 can be disposed within the cable end housing 280 and can extend from the first electrical connector 284 to the cable display module 210.

The electrical connector 284 can be any electrical connector configured to electrically couple to another electrical connector 264. In some embodiments, for example, the electrical connector 284 can include pins configured to be inserted into apertures defined by the electrical connector 264, apertures configured to receive pins from the electrical connector 264, and/or any other type of electrical interface. In some embodiments, the electrical connector 284 is also configured to physically couple to the electrical connector 264. In such embodiments, the electrical connector 264 can include, for example, a first portion of a snap, an aperture configured to receive a protrusion of the electrical connector 264, a protrusion configured to be inserted into an aperture of the electrical connector 264, a threaded member configured to receive a threaded member of the electrical connector 264, and/or the like.

Through the electrical conductor 215, the electrical connector 284 and the electrical connector 264, the cable display module 210 can be powered, can receive data signals associated with the components of the computing system 200 and/or can receive control signals associated with the operation of one or more of the components of the computing system 200. In such embodiments, for example, the cable display module 210 can receive and display an identifier associated with the chassis 260 (e.g., a serial number) via the electrical conductor. In some embodiments, the cable display module 210 can also receive and display error messages received from the chassis 260 via the electrical conductor 215 and the electrical connector 284. As described in further detail herein, in some embodiments, the cable display module 210 can also receive signals associated with a chassis (not shown in FIG. 3) to which a second end portion of the cable assembly 202 is coupled.

The chassis 260 can be functionally and structurally similar to the first chassis 160 and the second chassis 170, described above. As such, the chassis 260 can include, for example, line cards having optical and/or electrical modules. In some embodiments, for example, the chassis 260 includes modules within a switch fabric, as described in further detail herein.

The chassis 260 further includes a cable interface module 265, multiple optical connectors 262 and at least one electrical connector 264. The multiple optical connectors 262 can be similar to and are configured to be coupled to the multiple optical connectors 282. Through the optical connectors 262 and the optical connectors 282 an optical connection can be established between the optical fibers 203, the cable interface module 265 and a cable interface module (not shown in FIG. 3) of the chassis (not shown in FIG. 3) coupled to the opposite end of the cable assembly 202. Similarly, the at least one electrical connector 264 can be similar to and is configured to be coupled to the at least one electrical connector 284. Through the at least one electrical connector 264, the at least one electrical connector 284 and the electrical conductor 215, an electrical connection can be established between the cable display module 210 and the cable interface module 265.

The cable interface module 265 is configured to receive optical signals from the cable assembly 202, convert the optical signals into electrical signals and forward the electrical signals to their destination. As such, the cable interface module 265 can include optical transceivers configured to receive the optical signals from the optical connectors 262 and convert the optical signals into electrical signals. Such optical transceivers can be any suitable optical transceivers. In some embodiments, for example, the optical transceivers can be small form-factor pluggable transceivers (SFP or SFP+), 10 gigabit small form factor pluggable transceivers (XFP), and/or the like.

Similarly, the cable interface module 265 is configured to convert electrical signals into optical signals and send the optical signals to the second chassis via the optical fiber 203. As such, the cable interface module 265 can include optical transmitters configured to receive electrical signals from the line cards and other modules within the chassis 260 and convert the electrical signals into optical signals to be sent through the cable assembly 202 via the optical fibers 203. Such optical transmitters can be any suitable optical transmitters. In some embodiments, for example, the optical transmitters can be vertical-cavity surface-emitting lasers (VCSEL).

In some embodiments, the cable interface module 265 can include a processor. The processor can be any suitable processor configured to direct electrical and optical signals received by the cable interface module 265. The processor can be, for example, a microprocessor, a microcontroller, a programmable logic device (PLD), a complex programmable logic device (CPLD), and/or a field-programmable gate array (FPGA). The processor can be configured to transmit a signal containing information to the cable display module 210 based on a signal received from the optical fibers 203. Similarly, the processor can be configured to transmit a signal received from the optical fibers 203 to a specific line card (not shown) within the chassis 260. For another example, the processor can be configured to transmit a signal (e.g., a data packet) received from a line card to the second chassis via the optical fibers 203. In other embodiments, a central processor of the chassis 260 is configured to manage and run the cable interface module 265. In such embodiments, the central processor can manage the cable interface module 265 and/or the line cards within the chassis 260.

In some embodiments, the cable interface module 265 can also include a memory configured to store instructions for the processor of the cable interface module 265, store data sent via the cable interface module 265, store information about the chassis 260 to be communicated to the cable display module 210, store information about to which other chassis the chassis 260 should be connected, and/or the like. In some embodiments, for example, the memory can be a read-only memory (ROM), a random-access memory (RAM), an erasable programmable read-only memory (EPROM), an electrically erasable programmable read-only memory (EEPROM), a flash memory and/or any other suitable processor-readable medium. In other embodiments, such information is stored in a central memory of the chassis 260.

In use, an operator can couple the cable end housing 280 of the cable assembly 202 to the chassis 260 and a second cable end housing (not shown in FIG. 3) of the cable assembly 202 to a second chassis (not shown in FIG. 3). As discussed above, this optically couples the chassis 260 with the second chassis. Additionally, this electrically couples the cable display module 210 with the cable interface module 265. The second chassis can send identifying information associated with the second chassis to the chassis 260 via the optical fibers 203. As discussed above, such information can include, for example, a serial number of the second chassis, a physical port identifier and/or a logical port identifier of a port of the second chassis to which the second end housing of the cable assembly 202 is coupled, and/or the like. Further, as discussed above, the second chassis can send error messages to the chassis 260 via the optical fibers 203. Similarly, the chassis 260 can send information associated with the chassis 260 and/or error messages to the second chassis via the optical fibers 203.

The chassis 260 can power the cable display module 210 via the electrical conductor 215 and the electrical connector 284. After the cable display module 210 is powered, the processor of the cable display module 210 can cause the display device of the cable display module 210 to display identifying information associated with the cable assembly 202. Such information can be stored in the memory of the cable display module 210. Such information can include, for example, a serial number associated with the cable assembly 202, an identifier associated with an end of the cable assembly 202, a length of the cable assembly 202, a number of optical fibers 203 within the cable assembly 202, a type of cable assembly 202, and/or the like. Using the information displayed on the display device of the cable display module 210, an operator can easily identify the cable and determine whether it is correctly coupled.

Additionally, the chassis 260 can send electrical signals associated with the chassis 260 to the cable display module 210. Such information can include, for example, a serial number associated with the chassis 260, an identifier associated with a port number (physical and/or logical) to which the cable end housing 280 is coupled and/or the like. Such information can be displayed on the cable display module 210 to aid the operator in determining whether the cable is correctly connected.

Further, the second chassis (not shown in FIG. 3) can send optical signals to the chassis 260 via the optical fibers 203. Such optical signals can be associated with a serial number associated with the second chassis, a port number (physical and/or logical) to which the second cable end housing (not shown in FIG. 3) is coupled, a type of chassis of the second chassis and/or the like. The cable interface module 265 receives the optical signals from the second chassis and converts them into electrical signals. These electrical signals associated with the second chassis can then be sent to the cable display module 210 via the electrical conductor 215 and the electrical connectors 264, 284. The information associated with the second chassis can be displayed on the cable display module 210 to aid the operator in determining whether the cable is correctly connected. Specifically, this enables an operator to easily determine to which chassis the other end of the cable assembly 202 is coupled.

In some embodiments, the cable interface module 265 and/or another portion of the chassis includes a memory containing information describing to which other chassis (and/or which port of that chassis) the chassis 260 (and/or the port of the chassis 260) should be coupled. In some embodiments, such system configuration information can be pushed to the chassis 260 (and stored in the memory) by a central control module (not shown in FIG. 3) of the computing system 200. In such embodiments, the central control module can send updates to the system configuration periodically (e.g., every 10 minutes) and/or when a change in the system configuration occurs. In other embodiments, the chassis can receive system configuration information from the central control module in response to sending a request signal to the central control module. In other embodiments, such system configuration information can be manually input and stored in the memory of the chassis by an operator prior to the cable assembly being coupled to the chassis.

Such system configuration information can be used to determine whether the cable assembly 202 is correctly coupled between the chassis 260 and the other chassis. Specifically, when the cable interface module 265 receives the signals from the second chassis associated with identifying information of the second chassis, the cable display module 265 can use the information describing to which other chassis the chassis 260 should be coupled to determine whether the cable assembly 202 is correctly disposed between the chassis 260 and the second chassis. If the cable assembly 202 is correctly connected (i.e., the chassis 260 is supposed to be coupled to the second chassis), the cable interface module 265 can send an electrical signal to the cable display module 210 indicating that the cable assembly 202 correctly couples the chassis 260 to the second chassis. The cable display module 210 can display this information to the operator via the display device. If the cable assembly 202 is not correctly connected (i.e., the second chassis is not supposed to be coupled to the chassis 260 but is supposed to be coupled to a third chassis), the cable interface module 265 can send an electrical signal to the cable display module 210 indicating that the cable assembly 202 incorrectly couples the chassis 260 to the second chassis and that the cable end housing 280 should be coupled to the third chassis. The cable display module 210 can display this information (including an identifier associated with the third chassis, such as a serial number) to the operator via the display device. In such embodiments, an operator can easily determine if the cable assembly 202 is correctly coupled. Additionally, in such embodiments, if the cable assembly 202 is incorrectly coupled, the operator can easily determine how to remedy the error because the cable display module 210 can present to the operator an identifier associated with the chassis to which the cable end housing 280 is to be coupled.

In some embodiments, the cable display module 210 can include a battery (not shown in FIG. 3). In such embodiments, the battery can be used as a backup power source. The battery can power the cable display module 210 when the cable end housing 280 of the cable assembly 202 is not electrically coupled to the chassis 260. In such embodiments, for example, the processor of the cable display module 210 can cause the display device to display information (e.g., a serial number of the cable assembly 202, a type of the cable assembly 202, a serial number of the chassis 260, a serial number of a second chassis, etc.) stored within the memory of the cable display module 210 when an operator provides an indication to the cable display module 210 to display the information. Such an indication can be provided by, for example, an operator pressing a button (not shown in FIG. 3) on the cable display module 210. Information associated with the chassis 260 and the other chassis to which the cable assembly 202 is coupled, can be received and stored in the memory of the cable display module 210 when the cable assembly 202 is electrically coupled to the chassis 260. Such information can then be viewed by an operator after the cable assembly 202 is uncoupled from the chassis 260 when the operator provides the indication to the cable display module 210 to display the information. In some embodiments, the battery can be a rechargeable battery that recharges when the cable assembly 202 is electrically coupled to the chassis 260.

In other embodiments, the cable display module is not configured to be electrically coupled to the chassis. In such embodiments, the battery can be used as the primary source of power for the cable display module (e.g., the chassis does not power the cable display module). In such embodiments, the cable display module does not receive information from the chassis regarding the other components of the computing system. Accordingly, the cable display module is configured to display information associated with the computing system stored in the memory (e.g., information pertaining to the cable such as the cable serial number, the length of the cable, etc.) when an operator provides an indication to the display module to display the information (e.g., the operator pushes a button). In such embodiments, the display device can display the information for a predetermined amount of time (e.g., 30 seconds) and then turn the display off (e.g., to conserve battery life).

In still other embodiments, the cable display module can receive power and/or data from any other suitable source, such as, for example, a radio frequency (RF) connection between the cable display module and the chassis, an RF connection between the cable display module and a portable device carried with an operator, a battery and/or system that an operator plugs into the cable display module and/or the like.

Figure 4:
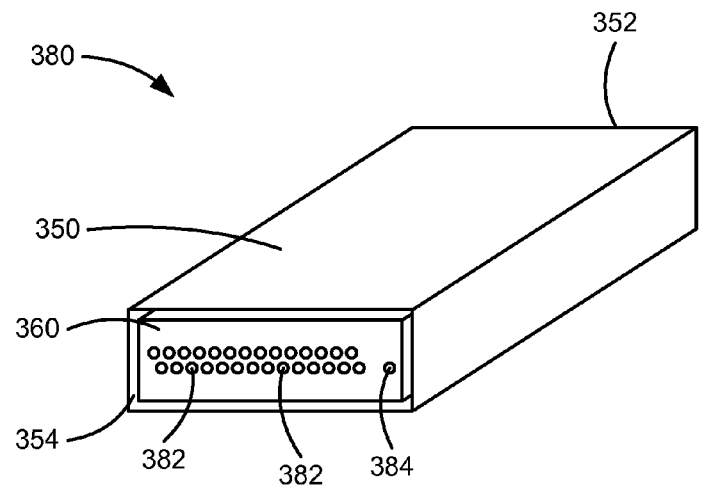
FIG. 4 is a front perspective view of a cable end housing, according to another embodiment.
Figure 5:
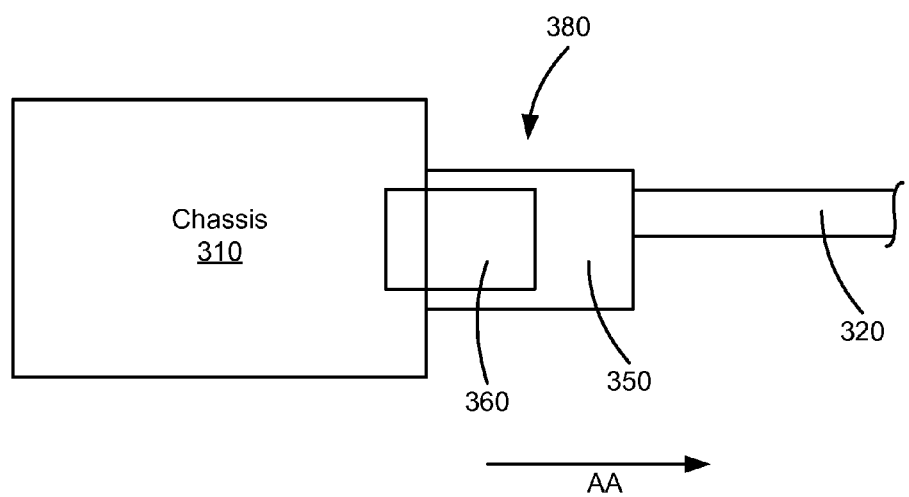
FIG. 5 is a schematic illustration of the cable end housing of FIG. 4 coupled to a chassis.
Figure 6:
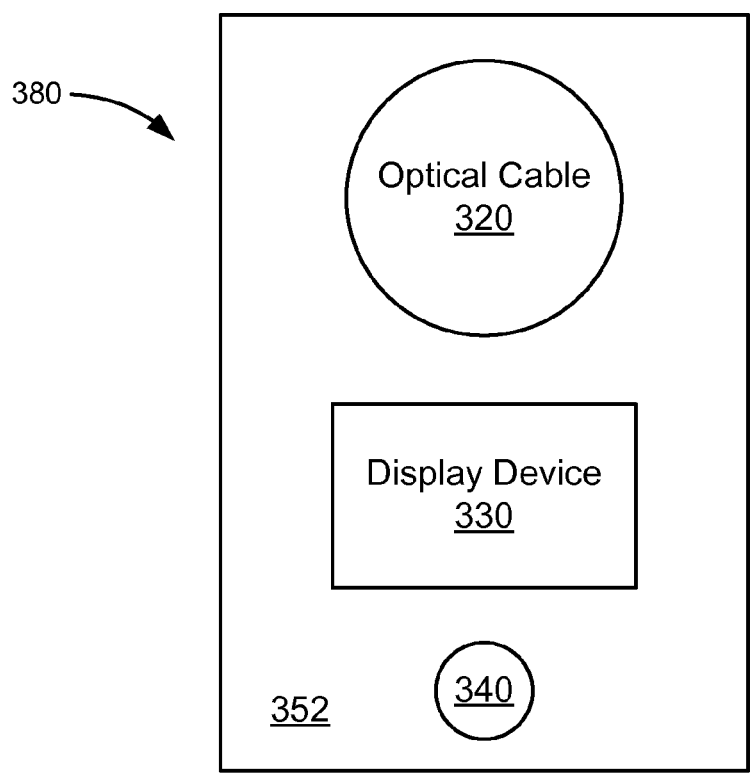
FIG. 6 is a back view of the cable end housing of FIG. 4, according to another embodiment.

FIGS. 4-6 show a cable end housing 380, according to another embodiment. The cable end housing 380 includes an outer casing 350 and an inner casing 360. The outer casing 350 is configured to protect the inner casing 360. When the cable end housing 380 is not coupled to a chassis, the outer casing 350 extends the length of the inner casing 360. The outer casing 350 can be constructed of any material suitable to protect the inner casing 360.

The outer casing 350 includes a first end face 354 and a second end face 352. The first end face 354 defines an aperture in which the inner casing 360 is movably disposed. As discussed in further detail herein, through the aperture of the first end face 354, the inner casing 360 can be extended out of the outer casing 352 and coupled to a chassis 310.

The second end face 352 of the outer casing 350 includes a push button 340 and a display device 330 (see e.g., FIG. 6). The second end face 352 defines an aperture through which the cable 320 passes into the cable end housing 380. The display device 330 can be similar to the display device 120 shown and described above in relation to FIG. 1. The push button 340 can be configured to allow an operator to indicate to a processor (not shown) of the cable end housing 380 to display information pertaining to the cable 320 and/or a system in which the cable end housing 380 is disposed on the display device 330.

The inner casing 360 is disposed within the outer casing 350 and includes, multiple optical fibers (not shown in FIGS. 4-6), multiple optical connectors 382, at least one electrical conductor (not shown in FIGS. 4-6) and at least one electrical connector 384. The optical connectors 382 can be any connector configured to optically couple the cable end housing 380 with a chassis 310. As such, the optical connectors 382 can be structurally and functionally similar to the optical connectors 282, shown and described above in relation to FIG. 3. Accordingly, the optical connectors 382 are configured to be connected to optical connectors (not shown in FIGS. 4-6) of a chassis 310. Similarly, the at least one electrical connector 384 can be configured to electrically couple the cable end housing 380 to the chassis 310. As such, the at least one electrical connector 384 can be structurally and functionally similar to the electrical connector 284 shown and described above in relation to FIG. 3. Accordingly, the at least one electrical connector 382 is configured to be connected to an electrical connector (not shown in FIGS. 4-6) of the chassis 310.

The cable end housing 380 includes a first position (see e.g., FIG. 4) and a second position (see e.g., FIG. 5). As described above, when the cable end housing 380 is in its first position, the inner housing 360 is disposed within the outer housing 350, as shown in FIG. 4. Accordingly, the outer housing 350 is configured to cover and protect the inner housing 360. In the second position, the inner housing 360 extends outside the outer housing 350. This allows the optical connectors 382 and the electrical connector 384 to be coupled to optical connectors and an electrical connector of a chassis 310.

The cable end housing 380 is biased in its first position. Accordingly, the inner housing 360 is protected by the outer housing 350 when the cable end housing 380 is not coupled to the chassis 310. The cable end housing 380 can be biased in its first position using any suitable mechanism. For example, the cable end housing 380 can be spring-loaded and/or the like.

The cable end housing 380 can be moved from its first position to its second position when it is coupled to the chassis 310. An operator can, for example, slide the outer casing 350 with respect to the inner casing 360 in the direction shown by the arrow AA in FIG. 5. In some embodiments, this can be done when the outer casing 350 contacts the chassis 310. The operator can then insert the inner casing 360, along with the optical connectors 382 and the electrical connector 384, into a port of the chassis 310. In some embodiments, once the optical connectors 382 and the electrical connector 384 are coupled to the optical connectors of the chassis 310 and the electrical connector of the chassis 310, respectively, the cable end housing 380 is in its second position (see e.g., FIG. 5).

When the cable end housing 380 is moved to its second position, the cable end housing 380 is mechanically coupled to the chassis 310 using any suitable mechanism. In some embodiments, for example, the cable end housing 380 is mechanically coupled to the chassis 310 using a snap-connector, a tab configured to be inserted into a detent defined by the chassis, a detent configured to receive a tab of the chassis, a screw configured to be inserted into a lumen defined by the chassis 310, and/or the like.

After the cable end housing 380 is coupled to the chassis 310, the chassis 310 can provide power to the display device 330 of the cable end housing 330 and/or information/signals to be displayed on the display device 330 of the cable end housing 380, as described above. Additionally, as described above, an operator can view information pertaining to the cable assembly with which the cable end housing 380 is part and/or information received from the chassis 310, by pressing the button 340.

Figure 7:
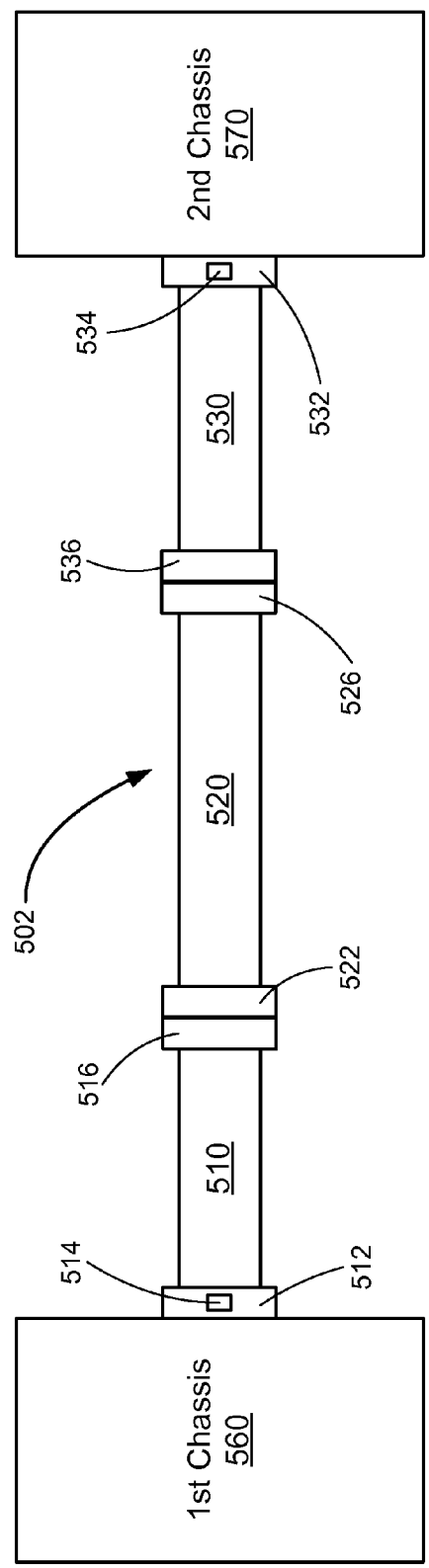
FIG. 7 is a schematic illustration of a system having a cable assembly disposed between two chassis, according to another embodiment.

While the cable assembly is shown and described above as being a single cable, in other embodiments, the cable assembly can include multiple cables coupled together. For example, FIG. 7 shows a cable assembly 502 including a first cable 510, a second cable 520 and a third cable 530 disposed between a first chassis 560 and a second chassis 570. In such embodiments, first cable 510, the second cable 520 and the third cable 530 can be coupled together to define a cable assembly 502 having a length longer than any of the individual cables 510, 520, 530.

The first cable 510 includes a first end connector 512 and a second end connector 516. The first end connector 512 can be similar to the cable end housing 380, shown and described above. The first end connector 512 also includes a cable display module 514. The cable display module 514 can be similar to the cable display modules shown and described above. Accordingly, the cable display module 514 can store and/or display information associated with the first cable 510, information associated with the first chassis 560 and/or information associated with the second chassis 570. The second end connector 516 is configured to optically and mechanically couple the first cable 510 to the second cable 520, as described in further detail herein. Accordingly, the second end connector 516 can be any suitable end connector. In some embodiments, for example, the second end connector 516 can be similar to the first end connector 512 without the cable display module 514. The third cable 530 is structurally and functionally similar to the first cable 510. Accordingly, the third cable includes a first end connector 532 having a cable display module 534 and a second end connector 536. The first end connector 532 is configured to be coupled to the second chassis 570 and the second end connector 536 is configured to optically and mechanically couple the third cable 530 with the second cable 520 as described in further detail herein.

The second cable 520 is disposed between the first cable 510 and the third cable 530 and includes a first end connector 522 and a second end connector 526. The first end connector 522 is configured to optically and mechanically couple the second cable 520 to the first cable 510. Accordingly, any suitable optical and mechanical coupling can be used. For example, the first end connector 522 can be optically coupled to the second end connector 516 of the first cable 510 using multiple-pin connectors, hollow tubes and/or any other device configured to operatively couple two optical cables. The first end connector 522 can be mechanically coupled to the second end connector 516 of the first cable 510 using, for example, an interface fit, a threaded connector, a snap connector, and/or the like. Similarly, the second end connector 526 can optically and mechanically couple the second cable 520 with the third cable 530. The cable 520 can be, for example, part of building(s) infrastructure that allows connections between rooms within a building and/or buildings.

In use, an operator optically couples the first chassis 560 to the second chassis 570 by coupling the first cable 510 with the first chassis 560 and the second cable 520, and by coupling the third cable with the second chassis 570 and the second cable 520. Additionally, by coupling the first end connector 512 with the first chassis 560, the cable display module 514 is electrically coupled to the first chassis 560. Accordingly, the first chassis 560 can send electrical signals associated with the first chassis 560 to the cable display module 514 so that information/signals can be displayed on a display device. Moreover, the first chassis 560 can receive optical signals from the second chassis 570 associated with information about the second chassis 570 and/or the third cable 530 and send to the cable display module 514 electrical signals associated with the information so that the information can be displayed on the display device of the cable display module 514. Such information can include, for example, a serial number associated with the second chassis 570, a serial number associated with the third cable 530, a length and/or type of the third cable 530, a port identifier (e.g., logical and/or physical) associated with the port of the second chassis 560, and/or the like. Similarly, by coupling the first end connector 532 with the second chassis 570, the cable display module 534 is electrically coupled to the second chassis 570. As such, the cable display module 534 can receive, store and/or display electrical signals associated with information pertaining to the second chassis 570, the first chassis 560 and/or the first cable 510.

Figure 7A:
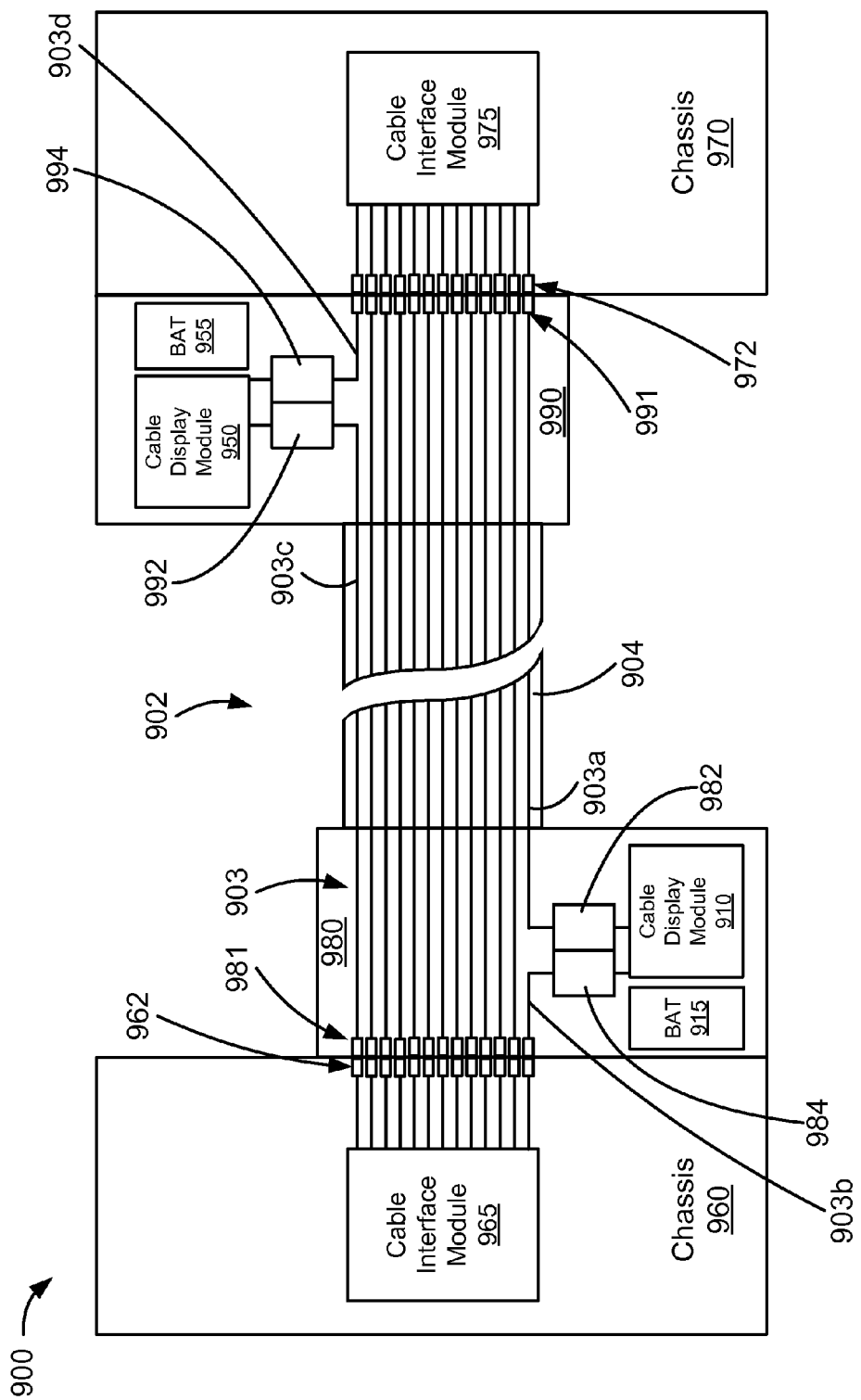
FIG. 7A is a schematic illustration of a system having a cable assembly disposed between two chassis, according to another embodiment.

In some embodiments, a cable assembly includes battery powered cable end housings that are optically coupled to the chassis of a system. For example, FIG. 7A is a schematic illustration of a system 900 having a cable assembly 902 disposed between a first chassis 960 and a second chassis 970, according to another embodiment. The cable assembly 902 includes a cable 904, a first cable end housing 980 and a second cable end housing 990. The cable end housings 980, 990 include batteries 915, 955 that supply power to the components of the cable end housings 980, 990. As such, the cable end housings 980, 990 need not be electrically coupled to the first chassis 960 or the second chassis 970.

The cable 904 has multiple optical fibers 903 that are configured to optically couple the first chassis 960 with the second chassis 970 such that optical signals can be sent between the first chassis 960 and the second chassis 970, as described in further detail herein. At least one optical fiber 903c is configured to optically couple the first chassis 960 with the second cable end housing 990 and at least one optical fiber 903b is configured to optically couple the first chassis 960 with the first cable end housing 980, as described in further detail herein. Similarly, at least one optical fiber 903a is configured to optically couple the second chassis 970 with the first cable end housing 980 and at least one optical fiber 903d is configured to optically couple the second chassis 970 with the second cable end housing 980 as described in further detail herein.

The first cable end housing 980 includes a cable display module 910, a battery 915, a first optical transceiver 982 and a second optical transceiver 984. Multiple optical fibers 903 of the cable 904 extend through the cable end housing 980 and are optically coupled to the first chassis 960 by the optical connectors 981 and the optical connectors 962. The first cable display module 910 can be similar to the cable display module 110, shown and described above. Accordingly, the cable display module 910 can include a processor (not shown in FIG. 7A), a display device (not shown in FIG. 7A) and a memory (not shown in FIG. 7A), similar to the processor 130, the display device 120 and the memory 140 shown and described above.

In some embodiments, the memory (not shown in FIG. 7A) can store information about the cable assembly 902, the first chassis 960 and/or the second chassis 970. For example, the memory can store information associated with a type of the cable assembly 902, a length of the cable assembly 902, an identifier of the cable assembly 902 (e.g., a serial number), the number of optical fibers 903 within the cable assembly 902, an identifier of the first chassis 960, an identifier of a port (physical or logical) of the first chassis 960, an identifier of the second chassis 970, an identifier of a port (physical or logical) of the second chassis 970, and/or the like.

As discussed above, the battery 915 is configured to provide power to the cable display module 910. As such, the cable display module 910 need not be electrically coupled to the first chassis 960 and the battery 915 can be the primary source of power to the cable display module 910. In some embodiments, the cable display module 910 can display information on the display device (not shown in FIG. 7A) when an operator provides an indication to the cable display module 910 to display the information (e.g., the operator pushes a button). In such embodiments, the display device can display the information for a predetermined amount of time (e.g., 30 seconds) and then turn the display off (e.g., to conserve battery life).

The optical transceivers 982, 984 are configured to receive optical signals from the second chassis 970 and the first chassis 960 via optical fibers 903a and 903b, respectively. The optical transceivers 982, 984 convert received optical signals into electrical signals and forward the electrical signals to the cable display module 910. The data associated with the electrical signals can be stored in the memory (not shown in FIG. 7A) and/or displayed on the display device (not shown in FIG. 7A). Such optical transceivers 982, 984 can be any suitable optical transceivers. In some embodiments, for example, the optical transceivers can be small form-factor pluggable transceivers (SFP or SFP+), 10 gigabit small form factor pluggable transceivers (XFP), and/or the like.

The second cable end housing 990 is structurally and functionally similar to the first cable end housing 980. As such, the second cable end housing 990 includes a cable display module 950, a battery 955, a first optical transceiver 992 and a second optical transceiver 994. The first optical transceiver 992 receives optical signals from the first chassis 960 via optical fiber 903c and the second optical transceiver 994 receives optical signals from the second chassis 970 via optical fiber 903d. The second cable end housing 990 is configured to be physically coupled to the second chassis 970. Similarly, multiple optical fibers 903 of the cable 904 extend through the cable end housing 990 and are optically coupled to the second chassis 970 by the optical connectors 991 and the optical connectors 972.

The first chassis 960 and the second chassis 970 are functionally and structurally similar to the chassis 260, described above. As such, the first chassis 960 and the second chassis 970 each include a cable interface module 965, 975 similar to the cable interface module 265, shown and described above.

In use, the first cable end housing 980 is physically coupled to the first chassis 960. This optically couples the first cable end housing 980 and the second cable end housing 990 with the first chassis 960. As such, the first chassis 960 can send data signals to the first cable end housing 980 and/or the second cable end housing 990. The optical data signals can be sent to the first cable end housing 980 and/or the second cable end housing 990, converted into electrical signals by the optical transceiver 984 and/or the optical transceiver 992, respectively, and received by the cable display module 910 and/or the cable display module 950. The cable display modules 910, 950 can store and/or display the data associated with the electrical signals. This allows an operator viewing the second cable end housing 990 to determine to which chassis the first cable end housing 980 is coupled (e.g., the first chassis 960). A battery powered cable display module 950 allows an operator to view information concerning the system 900 (including information associated with the first chassis 960) prior to coupling the second cable end housing 990 to the second chassis 970.

Similarly, the second cable end housing 990 can physically coupled to the second chassis 970. This optically couples the first cable end housing 980 and the second cable end housing 990 with the second chassis 970. As such, the second chassis 970 can send data signals to the first cable end housing 980 and/or the second cable end housing 990. The optical data signals can be sent to the first cable end housing 980 and/or the second cable end housing 990, converted into electrical signals by the optical transceiver 982 and/or the optical transceiver 994, respectively, and received by the cable display module 910 and/or the cable display module 950. The cable display modules 910, 950 can store and/or display the data associated with the electrical signals. This allows an operator viewing the first cable end housing 980 to determine to which chassis the second cable end housing 990 is coupled (e.g., the second chassis 970).

While shown and described above in relation to FIG. 7A as having a battery in both the first cable end housing 980 and the second cable end housing 990, in other embodiments, only the first cable end housing has a battery. In such embodiments, the second cable end housing can be powered by the second chassis when the second cable end housing is coupled to the second chassis, similar to the cable end housing 280 shown and described above. In still other embodiments, the first cable end housing and the second cable end housing are powered by the first chassis and the second chassis, respectively. In such embodiments, the first cable end housing and the second cable end housing can still be configured to be optically coupled to both the first chassis and the second chassis.

Figure 8:
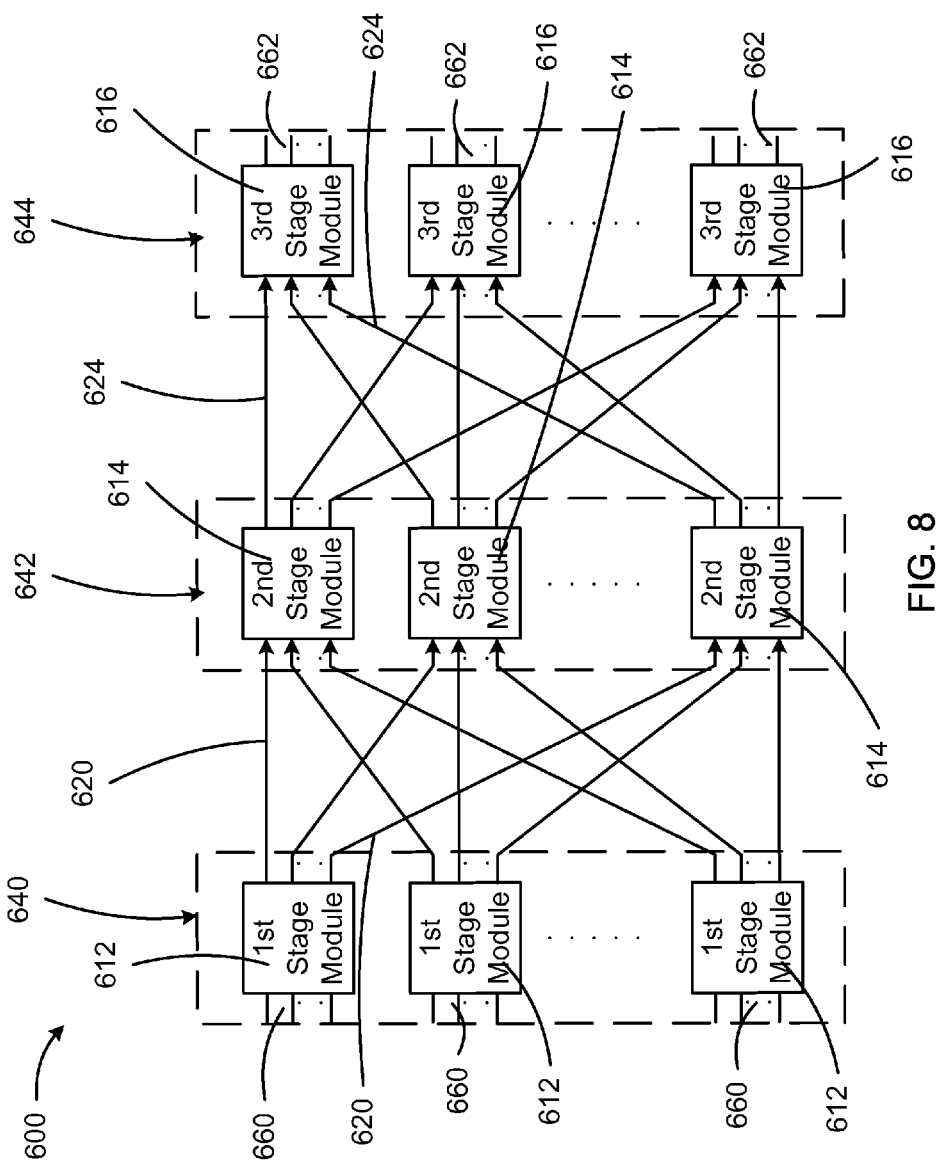
FIG. 8 is a schematic illustration of a Clos network, according to another embodiment.
Figure 9:
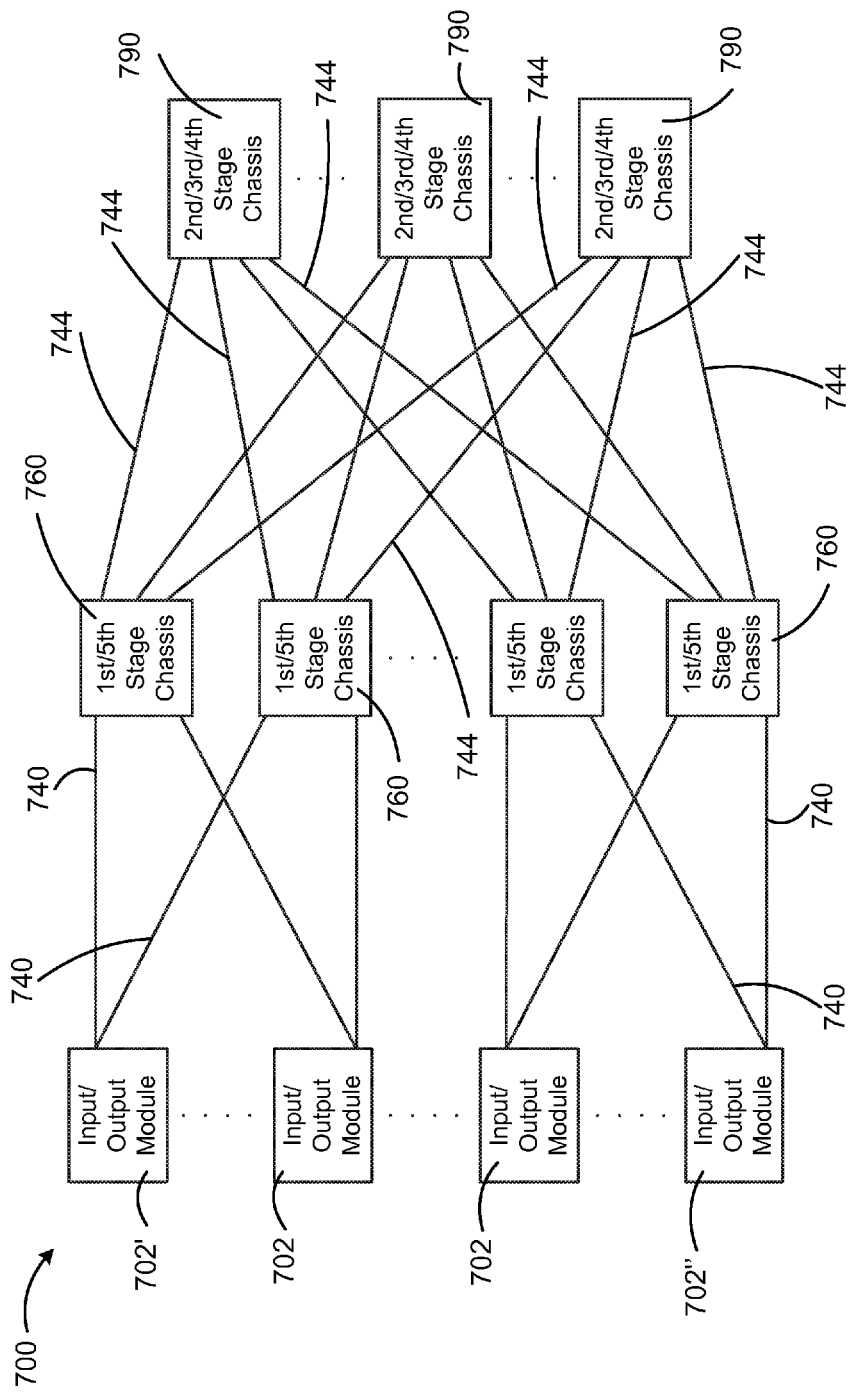
FIG. 9 is a schematic illustration of a switch fabric, according to another embodiment.

FIGS. 8-9 depict an example of the cable assemblies shown and described above used within a switch fabric. FIG. 8 is a schematic illustration of a switch fabric 600, according to an embodiment. Switch fabric 600 is a three-stage, non-blocking Clos network and includes a first stage 640, a second stage 642, and a third stage 644. While shown in FIG. 9 as having a given number of modules 612, 614, 616 in the first stage 640, the second stage 642 and the third stage 644, the switch fabric 600 can have any number of modules 612, 614, 616 in the first stage 640, the second stage 642 and/or the third stage 644, as shown by the ellipses in FIG. 9.

Each module 612 of the first stage 640 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 612 of the first stage 640 is a cell switch. The cell switches are configured to redirect data as it flows through the switch fabric 600. In some embodiments, for example, each cell switch includes multiple input ports operatively-coupled to write interfaces on a memory buffer (not shown). Similarly, each cell switch includes a set of output ports operatively-coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) per time period (e.g., one or more clock cycles) and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively-coupled to the output and data can flow. Alternatively, when a switch within the crossbar switch is in an "off" position, the input is not operatively-coupled to the output and data cannot flow. Thus, the switches within the crossbar switch control which input bars are operatively-coupled to which output bars.

Each module 612 of the first stage 640 includes a set of input ports 660 configured to receive data (e.g., a signal, a cell of a packet, etc.) as it enters the switch fabric 600. In some embodiments, the input ports 660 can be operatively coupled to input modules. Such input modules can be similar to the input/output modules 702 described in further detail herein with respect to FIG. 9. In this embodiment, each module 612 of the first stage 640 includes the same number of input ports 660.

The modules 614 of the second stage 642 are structurally similar to the modules 612 of the first stage 640. Each module 614 of the second stage 642 is operatively-coupled to each module 612 of the first stage 640 by a data path 620. Each module 614 of the second stage 642 can send and receive data and/or control signals from each module 612 of the first stage 640 via the data paths 620. In some embodiments, for example, the data paths 620 can be optical cables having various lengths. Additionally, the data paths 620 can be optical cables having very long lengths and/or ends in different physical locations (e.g., different rooms within a building and/or different buildings). As such, it can be difficult to determine whether the data paths 620 are correctly coupled. It can be especially true when, as in a large Clos network, many cables are used. Accordingly, the use of cable assemblies having cable display modules, as described above, can assist an operator in determining whether the system is correctly coupled. For example, after an operator has coupled a cable assembly between two chassis in the system, the operator can view the display device of the cable display module coupled to an end of the cable assembly to determine whether the cable assembly is correctly connected between the two chassis, as described above. In other embodiments, the data paths are within a midplane. In still other embodiments, two or more modules are contained within a single chip package and the data paths are electrical traces.

In some embodiments, the switch fabric 600 is a non-blocking Clos network. Thus, the number of modules 614 of the second stage 642 of the switch fabric 600 varies based on the number of input ports 660 of each module 612 of the first stage 640. In a rearrangeably non-blocking Clos network (e.g., a Benes network), the number of modules 614 of the second stage 642 is greater than or equal to the number of input ports 660 of each module 612 of the first stage 640. Thus, if n is the number of input ports 660 of each module 612 of the first stage 640 and m is the number of modules 614 of the second stage 642, then m≥n. In some embodiments, for example, each module of the first stage has five input ports. Thus, the second stage has at least five modules. All five modules of the first stage are operatively-coupled to all five modules of the second stage by data paths. Said another way, each module of the first stage can send data to any module of the second stage.

The modules 616 of the third stage 644 are structurally similar to the modules 612 of the first stage 640. The number of modules 616 of the third stage 644 can be equal to the number of modules 612 of the first stage 640. Each module 616 of the third stage 644 includes output ports 662 configured to allow data to exit the switch fabric 600. In some embodiments, the output ports 662 can be operatively coupled to output modules. Such output modules can be similar to the input/output modules 702 described in further detail herein with respect to FIG. 9. In this embodiment, each module 616 of the third stage 644 includes the same number of output ports 662. Further, the number of output ports 662 of each module 616 of the third stage 644 can be equal to the number of input ports 660 of each module 612 of the first stage 640.

Each module 616 of the third stage 644 is connected to each module 614 of the second stage 642 by a data path 624. The data paths 624 between the modules 614 of the second stage 642 and the modules 616 of the third stage 644 are configured to facilitate data transfer from the modules 614 of the second stage 642 to the modules 616 of the third stage 644.

The data paths 624 between the modules 614 of the second stage 642 and the modules 616 of the third stage 644 can be constructed in any manner configured to facilitate data transfer from the modules 614 of the second stage 642 to the modules 616 of the third stage 644. In some embodiments, for example, the data paths 624 include optical connectors and optical cables between the modules. In other embodiments, the data paths are within a midplane. In still other embodiments, two or more modules are contained within a single chip package and the data paths are electrical traces.

FIG. 9 is a schematic illustration of a five-stage switch fabric system 700, according to another embodiment. The switch fabric system 700 includes multiple input/output modules 702, multiple 1st/5th stage chassis, multiple 2nd/3rd/4th stage chassis 790, a first set of cables 740, and a second set of cables 744. In some embodiments, the switch fabric system 700 can be structurally and functionally similar to the switch fabrics shown and described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which are incorporated herein by reference in their entireties. While shown in FIG. 9 as having a given number of input/output modules 702, 1st/5th stage chassis 760 and 2nd/3rd/4th stage chassis 790, the five-stage switch fabric system 700 can have any number of input/output modules 702, 1st/5th stage chassis 760 and 2nd/3rd/4th stage chassis 790, as shown by the ellipses in FIG. 9.

The input/output modules 702 are configured to send data to and/or receive data from at least one 1st/5th stage chassis 760. Each input/output module 702 is also configured to perform a parsing function, a classifying function, a forwarding function, and a queuing-and-scheduling function. Thus, in this embodiment, packet parsing, packet classifying, packet forwarding, and packet queuing-and-scheduling all occur prior to a cell entering a 1st/5th stage chassis 760. Accordingly, these functions do not need to be performed at each stage of the switch fabric, thus, each module within the 1st/5th stage chassis 760 and each module within the 2nd/3rd/4th stage chassis 790 (described in further detail herein) need not include capabilities to perform these functions. This can reduce the cost, power consumption, cooling requirements and/or the physical area for each module of within the switch fabric. This also can reduce the latency associated with the switch fabric. In some embodiments, for example, the end-to-end latency (e.g., time to send data through the switch fabric from an input/output module 702' to another input/output module 702") can be lower than the end-to-end latency of a switch fabric system using an Ethernet protocol. In some embodiments, the throughput of the switch fabric can be constrained by the connection density of the switch fabric system 700 and not by power limitations and/or thermal limitations. The parsing function, classifying function, forwarding function, and queuing-and-scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each input/output module 702 is configured to connect to a first end of a cable of the first set of cables 740. Each cable 740 operatively couples an input/output module 702 to a 1st/5th stage chassis 760. The first set of cables 740 can be constructed of any material suitable to transfer data between the input/output modules 702 and the 1st/5th stage chassis 760. In some embodiments, for example, each cable 740 is constructed of multiple optical fibers. In such an embodiment, each cable 740 can have, for example, twelve transmit fibers and twelve receive fibers. The twelve transmit fibers of each cable 740 can include, for example, eight fibers for transmitting data, one fiber for transmitting a control signal, and three fibers for expanding the data capacity and/or for redundancy. Similarly, the twelve receive fibers of each cable 740 have, for example, eight fibers for receiving data, one fiber for receiving a control signal, and three fibers for expanding the data capacity and/or for redundancy. In other embodiments, any number of fibers can be contained within each cable. The transmit and receive designations of the fibers are from the perspective of the input/output modules 702. The designations are opposite if viewed from the perspective of the 1st/5th stage chassis 760.

In some embodiments, each input/output module 702 can be coupled to multiple 1st/5th stage chassis 760. In the embodiment illustrated in FIG. 7, for example, each input/output module 702 is coupled to two 1st/5th stage chassis 760. The second 1st/5th stage chassis 760 can be used for redundancy and/or greater capacity. In still other embodiments, more than two 1st/5th stage chassis can be used for increased redundancy and/or greater capacity. For example, four 1st/5th stage chassis can be operatively-coupled to each input/output module by, for example, four cables.

Each 1st/5th stage chassis 760 includes modules associated with a first stage of the switch fabric and modules associated with a fifth stage of the switch fabric. In some embodiments, the modules within the 1st/5th stage chassis 760 can be disposed on line cards. In such embodiments, each line card can include multiple modules. For example, a line card can include both modules associated with the first stage of the switch fabric and/or modules associated with the fifth stage of the switch fabric. The modules within the 1st/5th stage chassis 760 can be structurally and functionally similar to the modules shown and described above.

Similarly, each 2nd/3rd/4th stage chassis 790 includes modules associated with a second stage of the switch fabric, modules associated with a third stage of the switch fabric and modules associated with a fourth stage of the switch fabric. In some embodiments, the modules within the 2nd/3rd/4th stage chassis 790 can be disposed on line cards. In such embodiments, each line card can include multiple modules. For example, a line card can include modules associated with the second stage of the switch fabric, modules associated with the third stage of the switch fabric and/or modules associated with the fourth stage of the switch fabric. The modules within the 2nd/3rd/4th stage chassis 790 can be structurally and functionally similar to the modules shown and described above.

Each 1st/5th stage chassis 760 is operatively-coupled to each 2nd/3rd/4th stage chassis 790 via the second set of cables 744. The cables from the second set of cables 744 can be structurally and functionally similar to the cables from the first set of cables 740.

In some embodiments, a large number of cables from the first set of cables 740 and the second set of cables 744 can be used to operatively couple the input/output modules 702 with the 1st/5th stage chassis 760 and to operatively couple the 1st/5th stage chassis 760 with the 2nd/3rd/4th stage chassis 790. In some embodiments, for example, a switch fabric system 700 includes 7,096 input/output modules 702 each operatively-coupled to two of 64 1st/5th stage chassis 760. In such embodiments, 8,192 cables from the first set of cables 740 can be used. Additionally, in some embodiments, each 64 1st/5th stage chassis 760 can be operatively-coupled to 32 2nd/3rd/4th stage chassis 790. In such embodiments, 2,048 cables from the second set of cables 744 can be used. Accordingly, in such embodiments, a total of 10,240 cables can be used. In other embodiments, more than 10,240 cables can be used. In such embodiments, for example, each stage of the switch fabric can be disposed within a separate chassis and cables can be used between each stage of the switch fabric. In still other embodiments, less than 10,240 cables can be used.

In such large configurations, it can be difficult for an operator to determine whether the cables are correctly disposed within the system. Accordingly, the use of cable assemblies having cable display modules, as described above, can assist an operator in determining whether the system is correctly coupled. For example, after an operator has coupled a cable assembly between two chassis in the system, the operator can view the display device on the cable display module coupled to an end of a cable assembly to determine whether the cable assembly is correctly disposed between the two chassis, as described above. For example, after the operator has coupled the cable assembly between two chassis, the cable display module can display an error message if the cable is incorrectly coupled, a confirmation message if the cable is correctly coupled, an identifier associated with the cable assembly (e.g., a serial number), a length of the cable assembly, a type of the cable assembly, identifiers associated with the chassis and/or ports (physical and/or logical) of the chassis to which the cable assembly is coupled, a type of the chassis to which the cable assembly is coupled (e.g., whether the chassis is a 1st/5th stage chassis 760 or a 2nd/3rd/4th stage chassis 790), and/or the like.

In use, the switch fabric system 700 is configured to facilitate the transfer of data packets from a first input/output module 702' to a second input/output module 702". For example, the first input/output module 702' sends a data packet across a cable from the first set of cables 740 to a module associated with the first stage of the switch fabric 700 within the 1st/5th stage chassis 760. The module associated with the first stage of the switch fabric 700 within the 1st/5th stage chassis 760 sends the data packet to a module associated with a second stage of the switch fabric 700 within a 2nd/3rd/4th stage chassis 790. The module associated with the second stage of the switch fabric 700 sends the data packet to a module associated with a third stage of the switch fabric 700, which sends the data packet to a module associated with a fourth stage of the switch fabric 700 within the 2nd/3rd/4th stage chassis 790. The module associated with the fourth stage within the 2nd/3rd/4th stage chassis 790 sends the data packet to a module associated with a fifth stage of the switch fabric 700 within a 1st/5th stage chassis 760, which forwards the data packet to the second input/output module 702".

Figure 10:
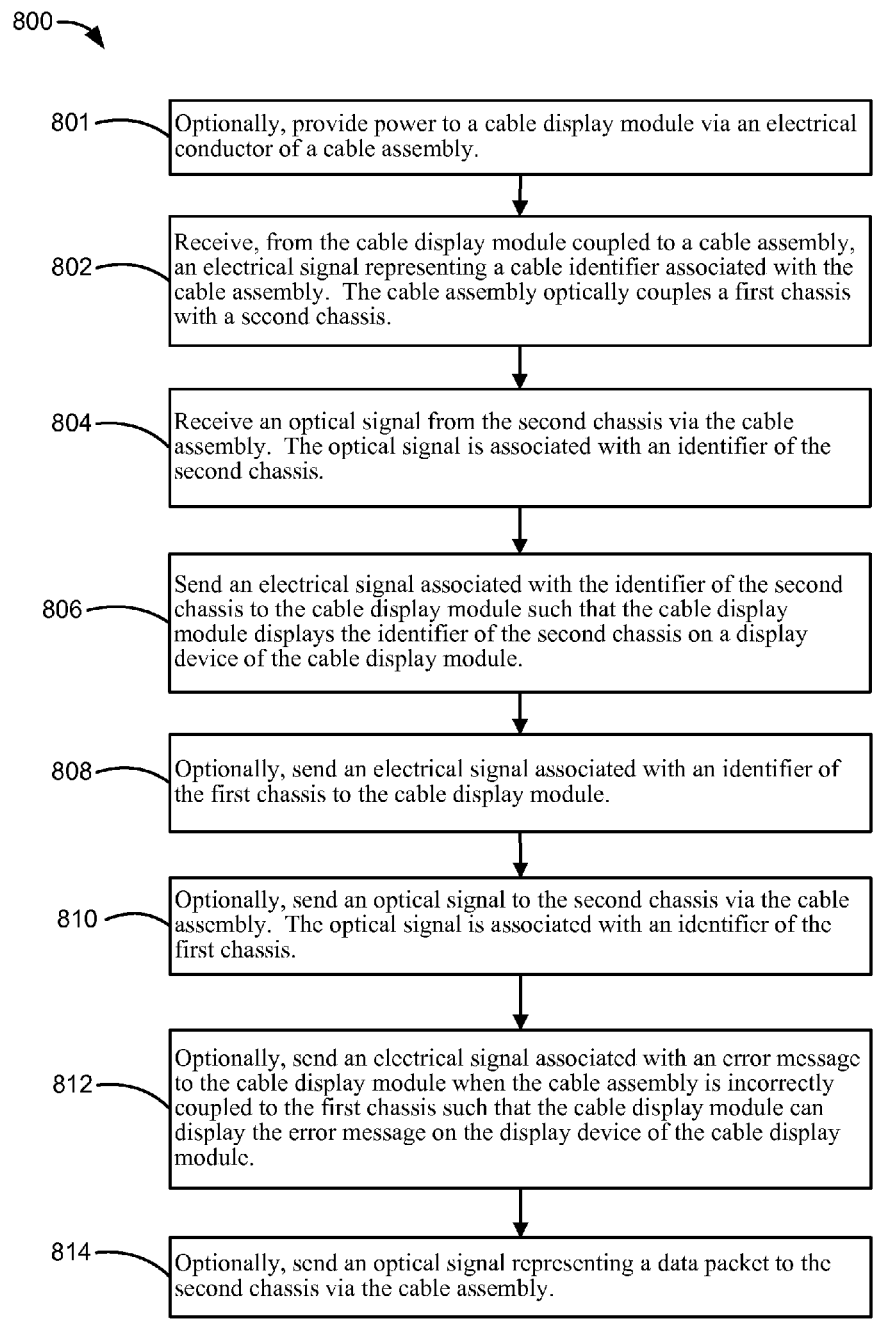
FIG. 10 illustrates a method of providing information to a cable display module, according to another embodiment.

FIG. 10 is a method 800 for providing information to a cable display module, according to an embodiment. The method 800 includes, optionally, providing power to a cable display module via an electrical conductor of a cable assembly, at 801. In some embodiments, the cable display module is electrically coupled to a first chassis. As such, the first chassis can provide power to the cable display module via the electrical connection. In other embodiments, a battery in the cable display module can provide power to the cable display module.

An electrical signal representing a cable identifier associated with the cable assembly is received from the cable display module coupled to a cable assembly, at 802. The cable assembly optically couples a first chassis with a second chassis. The cable display module can include a memory storing the cable identifier. Additionally, the cable display module can display the cable identifier on a display device or the cable assembly.

An optical signal from the second chassis is received via the cable assembly, at 804. The optical signal is associated with an identifier of the second chassis. The identifier of the second chassis can be, for example, a serial number associated with the second chassis. In some embodiments, an optical signal associated with a port number of the second chassis to which the cable assembly is coupled can also be received from the second chassis.

An electrical signal associated with the identifier of the second chassis is sent to the cable display module such that the cable display module displays the identifier of the second chassis on a display device of the cable display module, at 806. Similarly, an electrical signal associated with the port number of the second chassis to which the cable assembly is coupled can be sent to the cable display module such that the cable display module displays the port number of the second chassis on the display device. An electrical signal associated with an identifier of the first chassis is optionally sent to the cable display module, at 808. Similarly, the cable display module can display the identifier of the first chassis on the display device.

An optical signal associated with an identifier of the first chassis is optionally sent to the second chassis via the cable assembly, at 810. A module within the second chassis can then convert the optical signal into an electrical signal to send to a second cable display module. The second cable display module can then display the identifier of the first chassis.

An electrical signal associated with an error message is optionally sent to the cable display module when the cable assembly is incorrectly coupled to the first chassis such that the cable display module can display the error message on the display device of the cable display module, at 812. The error message can be in response to the first chassis receiving the identifier of the second chassis (or the port of the second chassis) and determining that the first chassis is not supposed to be connected to the second chassis (or the port of the second chassis). An operator can easily view the error message on the display device of the cable display module and correct the error by coupling the cable assembly to the correct chassis and/or port. An optical signal representing a data packet is optionally sent to the second chassis via the cable assembly, at 814. This can occur after the cable assembly is correctly coupled.

While various embodiments have been described above, it should be understood that they have been presented by way of example only, and not limitation. Where methods described above indicate certain events occurring in certain order, the ordering of certain events may be modified. Additionally, certain of the events can be performed concurrently in a parallel process when possible, as well as performed sequentially as described above.

For example, while the cable display modules shown and described above are shown as having a processor and a memory, in other embodiments, the processor and the memory are within the chassis and the cable display module includes a display device. In such embodiments, the display device is powered by the chassis and the processor in the chassis sends signals indicating to the display device what to display.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, in some embodiments, a cable display module is powered solely by a chassis electrically coupled to the cable display module, in other embodiments, the cable display module is powered solely by a battery within the cable display module and in still other embodiments, the cable display module can be powered by both a chassis and a battery.

What is claimed is:

1. An apparatus, comprising:
  a cable display module configured to be mechanically coupled to a first end portion of a cable assembly having at least one optical fiber (1) that extends between the first end portion of the cable assembly and a second end portion of the cable assembly and (2) optically couples a first chassis with a second chassis when the first end portion of the cable assembly is mechanically coupled to the first chassis and the second end portion of the cable assembly is mechanically coupled to the second chassis, the cable display module configured to receive an electrical signal representing an identifier associated with the second chassis when at least one of the first end portion of the cable assembly is mechanically coupled to the first chassis or the second end portion of the cable assembly is mechanically coupled to the second chassis, the cable display module configured to display the identifier in response to receiving the electrical signal.

2. The apparatus of claim 1, wherein the cable display module is configured to be electrically coupled to the first chassis when the first end portion of the cable assembly is mechanically coupled to the first chassis, the cable display module configured to receive the electrical signal from the first chassis.

3. The apparatus of claim 1, wherein the cable display module is configured to be electrically isolated from the second chassis.

4. The apparatus of claim 1, wherein the cable display module is configured to receive the electrical signal from at least one of an optical transceiver optically coupled to the first chassis or an optical transceiver optically coupled to the second chassis.

5. The apparatus of claim 1, wherein the cable display module is configured to be electrically coupled to and receive power from the first chassis via an electrical conductor of the cable assembly when the first end portion of the cable assembly is mechanically coupled to the first chassis.

6. The apparatus of claim 1, wherein the cable display module is configured to receive power from a battery operatively coupled to the cable display module.

7. The apparatus of claim 1, wherein the cable display module includes a processor-readable medium configured to store an identifier associated with the cable assembly.

8. The apparatus of claim 1, wherein the cable display module is configured to receive an electrical signal representing an identifier associated with the first chassis when at least one of the first end portion of the cable assembly is mechanically coupled to the first chassis or the second end portion of the cable assembly is mechanically coupled to the second chassis, the cable display module configured to display the identifier associated with the first chassis in response to receiving the electrical signal representing the identifier associated with the first chassis.

9. The apparatus of claim 1, wherein the cable display module is configured to receive an electrical signal representing an error message when the first end portion of the cable assembly is incorrectly coupled to the first chassis, the cable display module configured to display the error message in response to receiving the electrical signal representing the error message.

10. The apparatus of claim 1, wherein the cable display module is configured to receive an electrical signal representing an error message when the second end portion of the cable assembly is incorrectly coupled to the second chassis or the second end portion of the cable assembly is mechanically uncoupled from the second chassis, the cable display module configured to display the error message in response to receiving the electrical signal representing the error message.

11. The apparatus of claim 1, wherein the first chassis is associated with a first stage of a switch fabric, the second chassis being associated with a second stage of the switch fabric.

12. A non-transitory processor-readable medium storing code representing instructions to be executed by a processor, the code comprising code to cause the processor to:
  send a first optical signal associated with an identifier of a first chassis to a first optical transceiver configured to convert the first optical signal into a first electrical signal and send the first electrical signal to a first cable display module of a cable assembly optically coupled to at least one of the first chassis or a second chassis such that the first cable display module displays the identifier of the first chassis on a display device of the first cable display module in response to receiving the first electrical signal; and send a second optical signal associated with the identifier of the first chassis to a second optical transceiver configured to convert the second optical signal into a second electrical signal and send the second electrical signal to a second cable display module of the cable assembly such that the second cable display module displays the identifier of the first chassis on a display device of the second cable display module in response to receiving the second electrical signal.

13. The non-transitory processor-readable medium of claim 12, the code further comprising code to cause the processor to:

receive an optical signal from the first optical transceiver and representing a cable identifier associated with the cable assembly.

14. The non-transitory processor-readable medium of claim 12, wherein the first cable display module is mechanically coupled to a first end portion of the cable assembly that is configured to be connected to the first chassis, the second cable display module being mechanically coupled to a second end portion of the cable assembly that is configured to be connected to the second chassis.

15. The non-transitory processor-readable medium of claim 12, the code further comprising code to cause the processor to:

when the cable assembly is not coupled to the second chassis, send an optical signal associated with an identifier of the second chassis to the second optical transceiver that is configured to convert the optical signal associated with the identifier of the second chassis into a third electrical signal and send the third electrical signal to the second cable display module such that the second cable display module displays the identifier of the second chassis on the display device of the second cable display module in response to receiving the third electrical signal.

16. The non-transitory processor-readable medium of claim 12, the code further comprising code to cause the processor to:

when the cable assembly is incorrectly coupled to the first chassis, send an optical signal associated with an error message to the first optical transceiver that is configured to convert the optical signal associated with the error message into a third electrical signal and send the third electrical signal to the first cable display module such that the first cable display module displays the error message on the display device of the first cable display module in response to receiving the third electrical signal.

17. An apparatus, comprising:
a cable display module configured to be operatively coupled to a first chassis; and
an optical transceiver electrically coupled to the cable display module and configured to be optically coupled to the first chassis, the optical transceiver configured to receive, from the first chassis, an optical signal representing an identifier associated with at least one of the first chassis or a second chassis when the optical transceiver is optically coupled to the first chassis, the optical transceiver configured to convert the optical signal into an electrical signal and send the electrical signal to the cable display module, the cable display module configured to display the identifier in response to receiving the electrical signal.

18. The apparatus of claim 17, wherein the cable display module and the optical transceiver are configured to be coupled to a cable assembly, the optical transceiver configured to receive, from the first chassis, the optical signal representing the identifier when an end portion of the cable assembly is mechanically coupled to the first chassis.

19. The apparatus of claim 17, wherein the optical transceiver and the cable display module are configured to receive power from a battery operatively coupled to the optical transceiver and the cable display module.

20. The apparatus of claim 17, wherein the electrical signal is a first electrical signal, the optical transceiver is a first optical transceiver, the apparatus further comprising:

a second optical transceiver electrically coupled to the cable display module and configured to be optically coupled to a third chassis, the second optical transceiver configured to receive, from the third chassis, an optical signal representing an identifier associated with at least one of the third chassis or a fourth chassis when the second optical transceiver is optically coupled to the third chassis, the second optical transceiver configured to convert the optical signal representing the identifier associated with the third chassis or the fourth chassis into a second electrical signal and send the second electrical signal to the cable display module, the cable display module configured to display the identifier associated with at least one of the third chassis or the fourth chassis in response to receiving the second electrical signal.

* * * * *